US012659937B2

(12) United States Patent
Peng et al.

(10) Patent No.: US 12,659,937 B2
(45) Date of Patent: Jun. 16, 2026

(54) INFORMATION TRANSMISSION METHOD AND APPARATUS, IAB NODE, AND NETWORK DEVICE

(71) Applicant: VIVO MOBILE COMMUNICATION CO., LTD., Chang'an Dongguan (CN)

(72) Inventors: Shuyan Peng, Chang'an Dongguan (CN); Huan Wang, Chang'an Dongguan (CN); Jinhua Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 319 days.

(21) Appl. No.: 18/336,651

(22) Filed: Jun. 16, 2023

(65) Prior Publication Data

US 2023/0337206 A1    Oct. 19, 2023

Related U.S. Application Data

(63) Continuation of application No. PCT/CN2021/137735, filed on Dec. 14, 2021.

(30) Foreign Application Priority Data

Dec. 18, 2020    (CN) .......................... 202011507740.6

(51) Int. Cl.
*H04W 72/0453*    (2023.01)
*H04W 72/23*    (2023.01)
(52) U.S. Cl.
CPC ....... *H04W 72/0453* (2013.01); *H04W 72/23* (2023.01)

(58) Field of Classification Search
CPC ............. H04W 72/0453; H04W 72/23; H04W 72/231; H04W 72/232; H04W 72/27; H04W 88/04; H04W 88/085
See application file for complete search history.

(56) References Cited

U.S. PATENT DOCUMENTS

| | | | |
|---|---|---|---|
| 2016/0212627 A1* | 7/2016 | Venkatasubramanian | ................... H04L 5/001 |
| 2020/0107362 A1* | 4/2020 | Qi | ........................ H04W 88/085 |
| 2020/0229271 A1* | 7/2020 | You | ........................ H04W 72/23 |

(Continued)

FOREIGN PATENT DOCUMENTS

| | | | | |
|---|---|---|---|---|
| CN | 111901871 A | 11/2020 | | |
| WO | WO-2020086316 A1 * | 4/2020 | ............. | H04W 72/54 |

(Continued)

OTHER PUBLICATIONS

Machine translation (WIPO) of WO-2021203873-A1; Miao et al.; Oct. 2021 (Year: 2021).*

(Continued)

*Primary Examiner* — Benjamin H Elliott, IV
(74) *Attorney, Agent, or Firm* — Price Heneveld LLP

(57) ABSTRACT
This application provides an information transmission method and apparatus, an IAB node, and a network device, and pertains to the field of communications technologies. The method includes: performing information transmission according to frequency domain availability of a DU of an IAB node, where the frequency domain availability of the DU of the IAB node is indicated by a parent IAB node of the IAB node, configured by a centralized unit CU, or predefined by a protocol.

20 Claims, 4 Drawing Sheets

Indicate frequency domain availability of a DU of an IAB node to the IAB node    601

(56) References Cited

U.S. PATENT DOCUMENTS

| | | | | |
|---|---|---|---|---|
| 2021/0144718 | A1* | 5/2021 | Jyothi | H04W 72/53 |
| 2021/0258948 | A1* | 8/2021 | Abedini | H04W 72/54 |
| 2021/0315043 | A1* | 10/2021 | Luo | H04W 72/27 |
| 2022/0086829 | A1* | 3/2022 | Akl | H04W 72/0446 |
| 2022/0167364 | A1* | 5/2022 | Kurita | H04W 72/29 |
| 2022/0182160 | A1* | 6/2022 | Su | H04B 17/309 |
| 2022/0368506 | A1* | 11/2022 | Choi | H04W 72/04 |
| 2023/0171745 | A1* | 6/2023 | Ghanbarinejad | H04W 76/19 |
| | | | | 370/329 |
| 2023/0309067 | A1* | 9/2023 | You | H04W 72/044 |
| 2023/0318798 | A1* | 10/2023 | Su | H04W 72/54 |
| | | | | 370/329 |
| 2023/0337205 | A1* | 10/2023 | Peng | H04W 72/0453 |
| 2023/0337206 | A1* | 10/2023 | Peng | H04W 72/0453 |
| 2023/0345553 | A1* | 10/2023 | Maya | H04W 56/0045 |
| 2024/0397499 | A1* | 11/2024 | Liu | H04B 7/15542 |

FOREIGN PATENT DOCUMENTS

| | | | | |
|---|---|---|---|---|
| WO | 2020/205607 | A1 | 10/2020 | |
| WO | WO-2021203873 | A1 * | 10/2021 | H04W 72/20 |

OTHER PUBLICATIONS

"Integrated Access Backhauled Networks"; Teyeb et al.; 2019 IEEE 90th Vehicular Technology Conference (VTC2019-Fall) (Year: 2019).*

"On Integrated Access and Backhaul Networks: Current Status and Potentials"; Madapatha et al; IEEE Open Journal of the Communications Society ( vol. 1); Sep. 2020 (Year: 2020).*

English Translation CN114390584A; retrieved on Feb. 2, 2026 (Year: 2026).*

Machine translation (English) CN202011118893.1; filed Oct. 19, 2020 (Year: 2020).*

Foreign language (Chinese) CN202011118893.1; filed Oct. 19, 2020 (Year: 2020).*

Intel Corporation., "Enhancements to Resource Multiplexing between Child and Parent Links of an IAB Node," 3GPP TSG RAN WG1 #103-e, R1-2008995, pp. 1-11, (Oct. 26-Nov. 13, 2020).

Ntt Docomo, Inc., "Resource multiplexing between child and parent links of an IAB node," 3GPP TSG RAN WG1 #103-e, R1-2009190, pp. 1-8, (Oct. 26-Nov. 14, 2020).

International Search Report and Written Opinion of the International Searching Authority dated Mar. 8, 2022 as received in Application No. PCT/CN2021/137735.

Nokia, Nokia Shanghai Bell "Enhancements for Resource Multiplxing Among IAB Backhaul and Access Links," 3GPP TSG RAN WG1 #103-e, eMeeting, R1-2008863, Oct. 26-Nov. 13, 2020.

Lenovo, Motorola Mobility "Enhancements to Resource Multiplxing for IAB," 3GPP TSG RAN WG1 Meeting #103-e, e-Meeting, R1-2009108, Oct. 26-Nov. 13, 2020.

3rd Generation Partnership Project; Technical Specification Group Radio Access Network; NR; Radio Resource Control (RRC) Protocol Specification (Release 16), 3GPP TS 38.331 V16.2.0, Sep. 2020.

* cited by examiner

12

Network device

11

IAB node

| Perform information transmission according to frequency domain availability of a DU of an IAB node |
|---|

401

| Time domain availability indicator of cell 1 | Time domain availability indicator of cell 50 | Frequency domain availability indicator of cell 1 | Time domain availability indicator of cell 50 | ... |
|---|---|---|---|---|

| Time domain availability indicator of cell 1 | Frequency domain availability indicator of cell 1 | Time domain availability indicator of cell 50 | Time domain availability indicator of cell 50 | ... |
|---|---|---|---|---|

FIG. 5b

| Time-frequency domain availability indicator of cell 1 | Time-frequency domain availability indicator of cell 50 | ... |
|---|---|---|

FIG. 5c

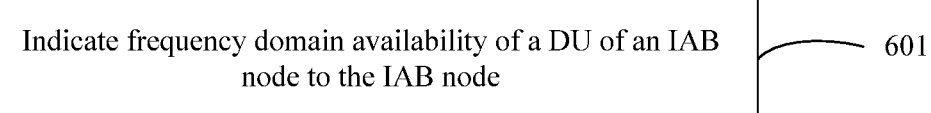

Indicate frequency domain availability of a DU of an IAB node to the IAB node — 601

FIG. 6

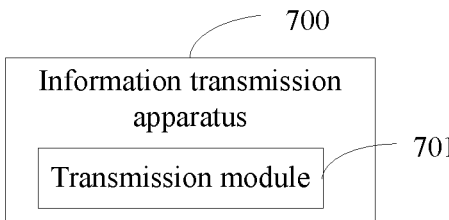

700

Information transmission apparatus

Transmission module — 701

FIG. 7

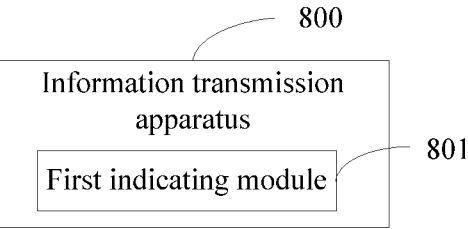

800

Information transmission apparatus

First indicating module — 801

FIG. 8

INFORMATION TRANSMISSION METHOD AND APPARATUS, IAB NODE, AND NETWORK DEVICE

CROSS-REFERENCE TO RELATED APPLICATIONS

The present application is a continuation application of International Application No. PCT/CN2021/137735 filed on Dec. 14, 2021, which claims priority to Chinese Patent Application No. 202011507740.6, filed on Dec. 18, 2020 in China, both of which are incorporated herein by reference in their entireties.

TECHNICAL FIELD

This application pertains to the field of communications technologies, and in particular, relates to an information transmission method and apparatus, an IAB node, and a network device.

BACKGROUND

An integrated access backhaul (Integrated Access Backhaul, IAB) system is a technology that has been standardized since the new radio (New Radio, NR) release 16 (Release 16, Rel-16). One IAB node includes a distributed unit (Distributed Unit, DU) function part and a mobile termination (Mobile Termination, MT) function part. In an integrated access backhaul loop, DUs of all IAB nodes are connected to one centralized unit (Centralized Unit, CU) node, and the CU node configures DUs by using an F1 control plane interface (F1-C) or an F1 application protocol (F1-AP protocol), and configures MTs by using a radio resource control (Radio Resource Control, RRC) protocol. The IAB system is introduced to address the situation where a wired transmission network is not deployed when access points are densely deployed, that is, the access points can rely on a wireless backhaul when there is no wired transmission network.

Currently, the DU and the MT may adopt time division multiplexing (Time Division Multiplexing, TDM), space division multiplexing (Space Division Multiplexing, SDM), or frequency division multiplexing (Frequency-division multiplexing, FDM). However, there is no relevant solution of how to use frequency domain resources to coordinate interference between IAB nodes or within an IAB node in a case that the DU and the MT perform information transmission through TDM or SDM or FDM.

SUMMARY

According to a first aspect, an embodiment of this application provides an information transmission method. The method includes:

performing information transmission according to frequency domain availability of a distributed unit DU of an IAB node, where
the frequency domain availability of the DU of the IAB node is indicated by a parent IAB node of the IAB node, configured by a centralized unit CU, or predefined by a protocol.

According to a second aspect, an embodiment of this application further provides an information transmission method. The method includes:

indicating frequency domain availability of a DU of an IAB node to the IAB node.

According to a third aspect, an embodiment of this application provides an information transmission apparatus. The apparatus includes:

a transmission module, configured to perform information transmission according to frequency domain availability of a distributed unit DU of an IAB node, where
the frequency domain availability of the DU of the IAB node is indicated by a parent IAB node of the IAB node, configured by a centralized unit CU, or predefined by a protocol.

According to a fourth aspect, an embodiment of this application further provides an information transmission apparatus. The apparatus includes:

a first indicating module, configured to indicate frequency domain availability of a DU of an IAB node to the IAB node.

According to a fifth aspect, an embodiment of this application further provides an IAB node. The IAB node includes a processor, a memory, and a program or an instruction that is stored in the memory and that can be run on the processor, where when the program or the instruction is executed by the processor, the steps of the method in the first aspect are implemented.

According to a sixth aspect, an embodiment of this application further provides a network device. The network device includes a processor, a memory, and a program or an instruction that is stored in the memory and that can be run on the processor, where when the program or the instruction is executed by the processor, the steps of the method in the second aspect are implemented.

According to a seventh aspect, an embodiment of this application further provides a readable storage medium. The readable storage medium stores a program or an instruction, and when the program or the instruction is executed by a processor, the steps of the method in the first aspect are implemented, or the steps of the method in the second aspect are implemented.

According to an eight aspect, an embodiment of this application further provides a chip. The chip includes a processor and a communications interface, the communications interface is coupled to the processor, and the processor is configured to run a program or an instruction to implement the method in the first aspect or the method in the second aspect.

According to a ninth aspect, a computer program product is provided. The computer program product is stored in a non-transitory storage medium, and the computer program product is executed by at least one processor to implement the method in the first aspect or the method in the second aspect.

According to a tenth aspect, a communications device is provided, configured to perform the method in the first aspect or the method in the second aspect.

BRIEF DESCRIPTION OF DRAWINGS

FIG. 5b is a second schematic diagram of a position of a frequency domain availability indicator in DCI according to an embodiment of this application;

FIG. 5c is a third schematic diagram of a position of a frequency domain availability indicator in DCI according to an embodiment of this application;

FIG. 6 is a flowchart of an information transmission method according to an embodiment of this application;

FIG. 7 is a structural diagram of an information transmission apparatus according to an embodiment of this application;

FIG. 8 is a structural diagram of another information transmission apparatus according to an embodiment of this application;

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (Long Term Evolution, LTE)/LTE-Advanced (LTE-Advanced, LTE-A) system, and can also be used in other wireless communications systems such as Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), Single-carrier Frequency-Division Multiple Access (Single-carrier Frequency-Division Multiple Access, SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a new radio (New Radio, NR) system for example purposes, and NR terms are used in most of the following descriptions, although these technologies can also be applied to an application other than an NR system application, for example, a 6th generation (6th Generation, 6G) communications system.

For ease of understanding, the following describes some content in the embodiments of this application.

Figure 1:
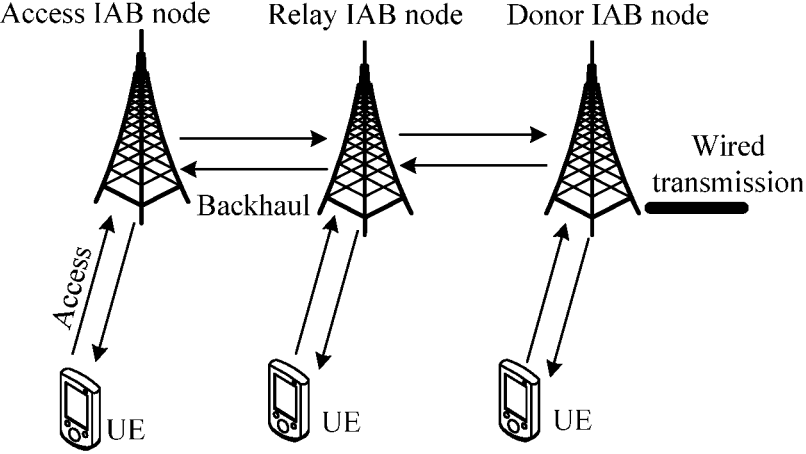
FIG. 1 is a schematic structural diagram of an IAB system according to an embodiment of this application.

Integrated Access Backhaul (Integrated Access Backhaul, IAB):

An IAB system is a technology that has been standardized since the new radio (New Radio, NR) release 16 (Release 16, Rel-16). FIG. 1 is a schematic structural diagram of an IAB system shown. One IAB node includes a distributed unit (Distributed Unit, DU) function part and a mobile termination (Mobile Termination, MT) function part. Depending on the MT, an access IAB node (that is, an IAB node) may find an upstream IAB node (that is, a parent IAB node), and establish a wireless connection with a DU of the access IAB node. The wireless connection is referred to as a backhaul link (backhaul link). After an IAB node establishes a complete backhaul link, the IAB node enables a DU function of the IAB node, and the DU provides a cell service, that is, the DU may provide an access service for UE. An integrated access backhaul loop further includes a donor IAB node (donor IAB node). The donor IAB node has a directly connected wired transmission network.

Figure 2:
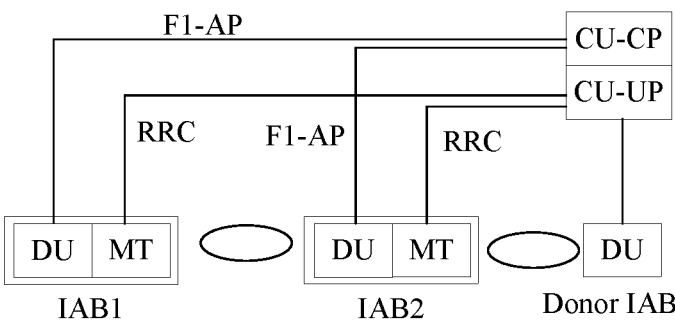
FIG. 2 is a schematic structural diagram of a CU-DU of an IAB system according to an embodiment of this application.

FIG. 2 is a schematic structural diagram of a centralized unit-distributed unit (Centralized Unit-Distributed Unit, CU-DU) of an IAB system. In an integrated access backhaul loop, DUs of all IAB nodes are connected to one CU node. The CU node includes a CU control plane (that is, CU-CP) and a CU user plane (that is, CU-UP). The CU node configures DUs by using an F1-C or an F1-AP (that is, an F1 application protocol) protocol, and configures MTs by using a radio resource control (Radio Resource Control, RRC) protocol. A donor IAB node does not have an MT function part. The IAB system is introduced to address the situation where a wired transmission network is not deployed when access points are densely deployed, that is, the access points can rely on a wireless backhaul when there is no wired transmission network.

Duplex (Duplexing) mode or multiplexing mode of the DU and the MT:

In a resource multiplexing mode of time division multiplexing (Time-Division Multiplexing, TDM) of the DU and the MT, a transceiver operation of the DU and a transceiver operation of the MT are time division multiplexing (TDMed). It should be noted that the duplex mode is half duplex.

In a resource multiplexing mode of frequency division multiplexing (Frequency Division Multiplexing, FDM) or space division multiplexing (Space Division Multiplexing, SDM) of the DU and the MT, a transceiver operation manner of the DU and the MT may include the following several duplex modes or multiplexing modes:

distributed unit transmit X (Distributed Unit Transmit X, DU-TX) & mobile termination transmit X (Mobile Termination Transmit X, MT-TX), that is, the DU is configured as downlink (Downlink, DL), and the MT is configured as uplink (Uplink, UL); or the DU has actual DL sending, and the MT has actual UL sending;

Distributed unit receive X (Distributed Unit Receive X, DU-RX) & Mobile Termination Receive X (Mobile Termination Receive X, MT-RX), that is, the DU is configured as UL, and the MT is configured as DL; or the DU has actual UL receiving, and the MT has actual DL receiving;

DU-TX & MT-RX, that is, the DU is configured as DL, and the MT is configured as DL, or the DU has actual DL sending, and the MT has actual DL receiving; and DU-RX & MT-TX, that is, the DU is configured as UL, and the MT is configured as UL, or the DU has actual UL receiving, and the MT has actual UL sending.

It should be noted that, in the embodiments of this application, DU TX and DU DL may be used interchangeably, MT TX and MT UL may be used interchangeably, DU RX and DU UL may be used interchangeably, and MT RX and MT DL may be used interchangeably.

In addition, a flexible (flexible) configuration may be equivalent to or independent of DL/UL configuration processing.

Resource configuration of the DU:

In the Rel-16 IAB network, a donor node CU configures a time domain resource of the DU by using signaling gNB-DU resource configuration (gNB-DU resource configuration) in an F1-AP (or an F1-C). A transmission type of a symbol (symbol) in each slot is configured, and the symbol type includes a DL/UL/flexible symbol (flexible symbol). Availability of a symbol of each type of the DU is configured, and configurations of a hard (hard) type/soft (soft) type/not Available (NA) type/shared (shared) type may be included. Availability is configured by using a symbol type as a configuration unit, and the following several cases may be specifically included:

If a DL symbol is configured as a hard type, the IAB DU may perform sending on the symbol. If a UL symbol is configured as a hard type, the IAB DU may perform receiving on the symbol. If a flexible (flexible) symbol is configured as a hard type, the IAB DU may perform sending or receiving on the symbol.

If a DL symbol is configured as a soft type, when sending by the IAB DU does not affect sending or receiving by the MT, the IAB DU may perform sending on the symbol; otherwise, not perform sending on the symbol. If a UL symbol is configured as a soft type, when receiving by the IAB DU does not affect sending or receiving by the MT, the IAB DU may perform receiving on the symbol; otherwise, not perform receiving on the symbol. If the flexible symbol is configured as a soft type, when sending or receiving by the IAB DU does not affect sending or receiving by the MT, the IAB DU may perform sending or receiving on the symbol; otherwise, not perform sending or receiving on the symbol. Further, the IAB parent node may indicate availability of a soft symbol (soft symbol) of the IAB DU by using downlink control information (Downlink Control Information, DCI) format 2_5 (format 2_5) (DCI format 2_5).

If the DL/UL/flexible symbol is configured as an NA type, the IAB DU does not perform sending or receiving on the symbol.

If the DL/UL/flexible symbol is configured as a shared (shared) type, the IAB DU and the IAB MT may simultaneously send and receive data on the symbol.

An available frequency domain resource of the DU is a bandwidth of a DU cell (cell). The CU may configure several carriers (carrier) that can be used by the DU, and the DU may schedule resources on the configured carriers.

For a frequency domain resource of the DU, availability of the frequency domain resource may be configured as a hard type/soft type/NA type/shared type.

If the frequency domain resource is configured as the hard type, the IAB DU may perform sending/receiving/sending or receiving on the frequency domain resource.

If a DL frequency domain resource is configured as a soft type, when sending by the IAB DU on the DL frequency domain resource does not affect sending or receiving by the MT, the IAB DU may perform sending on the DL frequency domain resource; otherwise, not perform sending on the frequency domain resource of the DL. If A UL frequency domain resource is configured as a soft type, when receiving by the IAB DU on the UL frequency domain resource does not affect sending or receiving by the MT, the IAB DU may perform receiving on the UL frequency domain resource; otherwise, not perform receiving on the UL frequency domain resource. If a flexible frequency domain resource is configured as a soft type, when sending or receiving by the IAB DU on the flexible frequency domain resource does not affect sending or receiving by the MT, the IAB DU may perform sending or receiving on the flexible frequency domain resource; otherwise, not perform sending or receiving on the flexible frequency domain resource.

If the frequency domain resource is configured as an NA type, the IAB DU does not perform sending or receiving on the frequency domain resource.

If the frequency domain resource is configured as a shared type, the IAB DU and the IAB MT may simultaneously send and receive data on the frequency domain resource.

Configuration of downlink control information (Downlink control information, DCI) format 2_5 (format 2_5) (DCI format 2_5) is as follows:

For each IAB node or each cell of the IAB DU, the following information is provided:

an identifier of an IAB DU serving cell (iabDuCellId-AI);

a position (positionInDCI-AI) of an availability indicator (AI) (hereinafter referred to as an AI) in DCI format 2_5;

a set of availability combination indicators (FreqAvailabilityCombinations), where each availability combination indicator includes:

a resource availability indicator (resourceAvailability), used to indicate availability of symbol resources of a soft type in one or more slots; and mapping between a soft-type symbol availability combination provided by a resource availability indicator (resourceAvailability) and a corresponding availability indicator index field value of DCI format 2_5 provided by an availability combination identifier (AvailabilityCombinationId).

The IAB-DU assumes that an availability combination uses an SCS configuration provided by an IAB-DU uplink/downlink configuration (IAB-DU-Resource-Configuration-TDD-Config).

One AI indicator in DCI format 2_5 IAB DU indicates availability of one or more slots for the IAB DU. A size indicated of the AI indicator is max {ceil (log2 (maxAIindex+1)), and 1} bits (bit), where maxAIindex represents a maximum AI index (index). Availability of a soft-type symbol is obtained according to an AI index and a radio resource control (Radio Resource Control, RRC) configuration table. Specifically, an availability indicator of a soft-type symbol in a slot (slot) may be shown in Table 1.

TABLE 1

Mapping between a value of a resource availability index
and an availability type of a soft symbol in a slot

| Value | Indicator |
|---|---|
| 0 | Availability of a soft symbol is not indicated |
| 1 | DL soft symbol is available |
|  | Availability of UL and flexible soft symbols is not indicated |
| 2 | UL soft symbol is available |
|  | Availability of DL and flexible soft symbols is not indicated |
| 3 | UL and DL soft symbols are available |
|  | Availability of a flexible soft symbol is not indicated |
| 4 | Flexible soft symbol is available |
|  | Availability of UL and DL soft symbols is not indicated |
| 5 | DL and flexible soft symbols are available |
|  | Availability of a UL soft symbol is not indicated |
| 6 | UL and flexible soft symbols are available |
|  | Availability of a DL soft symbol is not indicated |
| 7 | DL, UL and flexible soft symbols are all available |

An optional implementation code of the RRC configuration may be as follows:

```
AvailabilityCombinationsPerCell information element
-- ASN1START
-- TAG-AVAILABILITYCOMBINATIONSPERCELL-START
AvailabilityCombinationsPerCell-r16 ::=                    SEQUENCE {
    availabilityCombinationsPerCellIndex-r16
AvailabilityCombinationsPerCellIndex-r16,
    iab-DU-CellIdentity-r16                    CellIdentity,
    positionInDCI-AI-r16                    INTEGER(0..maxAI-DCI-PayloadSize-r16-1)
OPTIONAL, -- Need M
    availabilityCombinations-r16                    SEQUENCE (SIZE
(1..maxNrofAvailabilityCombinationsPerSet-r16)) OF AvailabilityCombination-r16,
    ...
}
    AvailabilityCombinationsPerCellIndex-r16                    ::=
INTEGER(0 .. maxNrofDUCells-r16)
    AvailabilityCombination-r16 ::=            SEQUENCE {
    availabilityCombinationId-r16            AvailabilityCombinationId-r16,
    resource Availability-r16                    SEQUENCE (SIZE
(1..maxNrofResourceAvailabilityPerCombination-r16)) OF INTEGER (0..7)
}
    AvailabilityCombinationId-r16            ::=            INTEGER
(0..maxNrofAvailabilityCombinationsPerSet-r16-1)
    -- TAG-AVAILABILITYCOMBINATIONSPERCELL-STOP
    -- ASN1STOP
```

It should be noted that, in the foregoing manner, a corresponding time domain indicator number (Entry) is first found according to the time domain availability indicator in DCI format 2_5, and then a corresponding frequency domain availability combination is found according to the time domain indicator number and the frequency domain availability indicator. That is, the frequency domain resource indicator is an indicator embedded in each time domain indicator number.

Figures 3, 4, 5A:
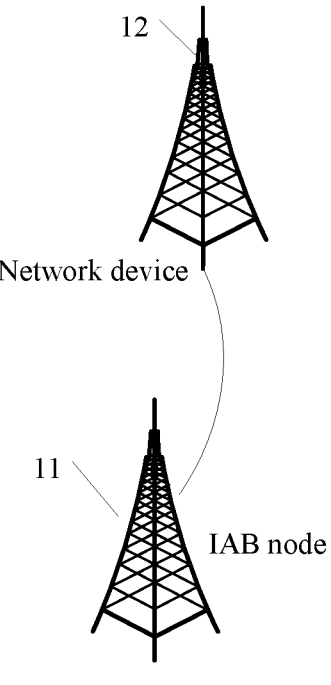
FIG. 3 is a structural diagram of a network system to which the embodiments of this application can be applied.
FIG. 4 is a flowchart of an information transmission method according to an embodiment of this application.
FIG. 5a is a first schematic diagram of a position of a frequency domain availability indicator in DCI according to an embodiment of this application.

FIG. 3 is a structural diagram of a wireless communications system to which embodiments of this application can be applied. The wireless communications system includes an IAB node 11 and a network device 12. The network device 12 may be a parent IAB node of the IAB node 11 or a CU.

With reference to the accompanying drawings, the information transmission method provided in the embodiments of this application is described in detail by using specific embodiments and application scenarios.

Referring to FIG. 4, FIG. 4 is a flowchart of an information transmission method according to an embodiment of this application. The method is performed by an integrated access backhaul IAB node. As shown in FIG. 4, the method includes the following steps.

Step 401: Perform information transmission according to frequency domain availability of a DU of the IAB node.

The frequency domain availability of the DU of the IAB node is indicated by a parent IAB node of the IAB node, configured by a centralized unit CU, or predefined by a protocol.

In this embodiment of this application, the DU of the IAB node may also be referred to as an IAB DU. In addition, an MT of the IAB node may also be referred to as an IAB MT.

The frequency domain availability may be availability of a frequency domain resource. Optionally, the frequency domain availability may include at least one of a hard (hard) type, a soft (soft) type, a not available (NA) type, and a shared (shared) type. A frequency domain resource whose frequency domain availability is a hard type may only be used by the IAB DU; a frequency domain resource whose frequency domain availability is a soft type can only be used by the IAB DU when the IAB MT is not affected; a frequency domain resource whose frequency domain availability is a not available type cannot be used by the DU; and a frequency domain resource whose frequency domain availability is a shared type may be used by both the IAB DU and the IAB MT.

Optionally, the frequency domain availability may alternatively include only TDM and simultaneous transmission (Simultaneously Transmission), where simultaneous transmission indicates that both the MT and the DU can transmit information on a same time domain resource; or includes at least one of a multiplexing mode A, a multiplexing mode B, a multiplexing mode C, a multiplexing mode D, and only TDM.

The multiplexing mode A may represent DU-TX & MT-TX, that is, the DU is configured as DL, and the MT is configured as UL; the multiplexing mode B may represent DU-RX & MT-RX, that is, the DU is configured as UL, and the MT is configured as DL; the multiplexing mode C may represent DU-TX & MT-RX, that is, the DU is configured as DL, and the MT is configured as DL; and the multiplexing mode D may represent DU-RX & MT-TX, that is, the DU is configured as UL, and the MT is configured as UL.

The frequency domain availability of the DU of the IAB node may be indicated by the parent IAB node of the IAB node. For example, the parent IAB node may indicate the frequency domain availability of the DU of the IAB node by using DCI, a Media Access Control (Media Access Control, MAC) control element (Control Element, CE) (that is, a MAC CE), RRC, or the like. Alternatively, the frequency domain availability of the DU of the IAB node may be indicated by a CU. For example, the CU may indicate the frequency domain availability of the DU of the IAB node by using F1-C, a backhaul adaptation protocol control packet data unit (Backhaul Adaptation Protocol control Packet Data Unit, BAP control PDU), or the like. Alternatively, the frequency domain availability of the DU of the IAB node may be predefined by the protocol.

It should be noted that the frequency domain availability of the DU of the IAB node may be explicitly configured. For example, a frequency domain availability indicator of the DU is sent to the IAB node by using signaling such as RRC, F1-C, DCI, or a MAC CE. Alternatively, the frequency domain availability of the DU of the IAB node may be implicitly configured. For example, in a case that a frequency domain resource of the IAB MT overlaps a frequency domain resource of the IAB DU, frequency domain availability of the frequency domain resource of the IAB DU is specified as a soft type, or frequency domain availability of the frequency domain resource of the overlapping part is specified as a soft type.

According to the information transmission method provided in this embodiment of this application, information transmission is performed according to frequency domain availability of a distributed unit DU of an IAB node, where the frequency domain availability of the DU of the IAB node is indicated by a parent IAB node of the IAB node, configured by a centralized unit CU, or predefined by a protocol. The frequency domain availability of the DU is configured to coordinate information transmission between IAB nodes or within an IAB node, thereby reducing interference between the IAB nodes or within the IAB node.

Optionally, the method may further include:

receiving a first indicator, where the first indicator is used to indicate at least one of the following:

the frequency domain availability of the DU of the IAB node;

a mapping relationship between an index of a frequency domain availability combination and the frequency domain availability combination;

the frequency domain availability combination; and the index of the frequency domain availability combination.

In this embodiment of this application, the frequency domain availability combination may include availability of a plurality of frequency domain resources. For example, the frequency domain availability combination may include availability of some or all frequency domain resources of a soft type; or availability of some or all frequency domain resources; or availability of frequency domain resources of a plurality of types (that is, hard, soft, NA, and the like); or availability of frequency domain resources of a plurality of multiplexing modes or duplex modes (that is, MT TX/DU TX, MT RX/DU RX, MT TX/DU RX, MT RX/DU TX, TDM, and the like); or availability of frequency domain resources in a plurality of link directions (that is, UL/DL/ Flexible); or availability of frequency domain resources in a plurality of slots or symbols. This is not limited in this embodiment of this application.

For example, the frequency domain availability combination may include availability of a UL frequency domain resource, availability of a DL frequency domain resource, and availability of a flexible frequency domain resource; or the frequency domain availability combination may include availability of a frequency domain resource of a soft type and availability of a frequency domain resource of a hard type; or the frequency domain availability combination may include availability of a UL frequency domain resource in a frequency domain resource of a soft type, availability of a DL frequency domain resource in the frequency domain resource of the soft type, and availability of a flexible frequency domain resource in the frequency domain resource of the soft type.

There is a mapping relationship between the index (index) of the frequency domain availability combination and the frequency domain availability combination. The IAB node may find the corresponding frequency domain availability combination based on the index of the frequency domain availability combination and the mapping relationship between the index of the frequency domain availability combination and the frequency domain availability combination.

It should be noted that the frequency domain availability of the IAB DU and time domain availability of the IAB DU may be separately indicated, that is, the first indicator may be only used to indicate the frequency domain availability of the IAB DU. The frequency domain availability of the IAB DU and the time domain availability of the IAB DU may also be jointly indicated, that is, the first indicator may be used to indicate the frequency domain availability and the time domain availability.

In this embodiment of this application, the parent IAB node of the IAB node or the CU may send the first indicator to the IAB node, so that the IAB node can determine the frequency domain availability of the IAB DU based on the first indicator, and perform information transmission based on the frequency domain availability of the IAB DU, thereby reducing interference between IAB nodes or inside an IAB node. In addition, because the parent IAB node of the IAB node or the CU explicitly indicates the frequency domain availability of the IAB DU to the IAB node by using the first indicator, not only efficiency of determining the frequency domain availability of the IAB DU can be improved, but also flexibility of configuring the frequency domain availability of the IAB DU can be improved.

Optionally, the first indicator is further used to indicate time domain availability of the DU of the IAB node.

In this embodiment of this application, the frequency domain availability of the IAB DU and the time domain availability of the IAB DU are jointly indicated, that is, the first indicator may be used to indicate the frequency domain availability and the time domain availability of the IAB DU. In this way, configuration signaling can be saved.

Optionally, the first indicator is carried in downlink control information DCI or a Media Access Control control element MAC CE or radio resource control RRC or F1-C signaling or a backhaul adaptation protocol control packet data unit BAP control PDU.

In this embodiment of this application, in a case that the parent IAB node of the IAB node indicates the frequency domain availability of the DU to the IAB node, the first indicator may be carried in DCI, a MAC CE, or RRC. In a case that the CU indicates the frequency domain availability of the DU to the IAB node, the first indicator may be carried in F1-C signaling or a BAP control PDU.

It should be noted that, in a case that the first indicator is carried in DCI, the DCI may be used only to carry a frequency domain availability indicator of the DU, that is, the first indicator; or may carry both a frequency domain availability indicator and a time domain availability indicator of the DU.

Optionally, the DCI may be a DCI format 2_5 or a downlink control information (Downlink Control Information, DCI) format 2_0 (format 2_0) (that is, DCI format 2_0), or may be a newly defined DCI format, for example, defined DCI specifically used for the frequency domain availability indicator of the DU.

Optionally, the DCI may be DCI scrambled by using a specific radio network temporary identifier (Radio Network Temporary Identifier, RNTI); or DCI obtained in a specific search space; or DCI obtained in a specific control resource set.

Optionally, a position and/or a size of the first indicator in the DCI is configured by RRC.

The position of the first indicator in the DCI may include at least one of a start position of the first indicator in the DCI, an end position of the first indicator in the DCI, and a position range of the first indicator in the DCI.

Specifically, the parent IAB node of the IAB node may configure, by using RRC, the position and/or the size of the first indicator in the DCI to the IAB node, so that the IAB node can quickly obtain the first indicator from the DCI based on the position and/or the size of the first indicator in the DCI.

In this embodiment of this application, the position and/or the size of the first indicator in the DCI is configured by using RRC, so that flexibility of configuring the first indicator can be improved.

Optionally, the position of the first indicator in the DCI is determined according to a position of a time domain availability indicator of the DU of the IAB node in the DCI.

In this embodiment of this application, a position of a frequency domain availability indicator of the IAB DU in the DCI is related to a position of a time domain availability indicator of the IAB DU in the DCI. In this way, the IAB node may determine the position of the frequency domain availability indicator (that is, the first indicator) of the IAB DU in the DCI based on the position of the time domain availability indicator of the IAB DU in the DCI, thereby saving indicator signaling overheads of the position of the frequency domain availability indicator.

Optionally, the position of the first indicator in the DCI is one of the following:

a position obtained after a position, in the DCI, of a last time domain availability indicator in the DCI is shifted by a first offset value, where the first offset value is an offset value of a frequency domain availability indicator;

a position obtained after the position of the time domain availability indicator of the DU of the IAB node in the DCI is shifted by a second offset value, where the second offset value is a size of the time domain availability indicator; and the position of the time domain availability indicator of the DU of the IAB node in the DCI.

In this embodiment of this application, a value of the first offset value may be indicated by the parent IAB node or the CU, predefined by the protocol, or determined according to a size of the time domain availability indicator.

The position (positionInDCI-AIlast), in the DCI, of the last time domain availability indicator in the DCI may be a start position or an end position, in the DCI, of the last time domain availability indicator in the DCI.

The position of the time domain availability indicator of the DU of the IAB node in the DCI may be a start position or an end position of the time domain availability indicator of the IAB DU in the DCI.

In an implementation, the position of the frequency domain availability indicator (that is, the first indicator) of the IAB DU in the DCI may be the position obtained after the position, in the DCI, of the last time domain availability indicator in the DCI is shifted by the first offset value. For example, as shown in FIG. 5a, the position or the start position of the frequency domain availability indicator in the DCI (that is, a position of a frequency domain availability indicator field)=positionInDCI-AIlast+position indicator size, where positionInDCI-AIlast is the position or the start position, in the DCI, of the last time domain availability indicator in the DCI, and position indicator size is a size of the time domain availability indicator.

In another implementation, the position of the frequency domain availability indicator (that is, the first indicator) of the IAB DU in the DCI may be the position obtained after the position of the corresponding time domain availability indicator in the DCI is shifted by the second offset value.

For example, as shown in FIG. 5b, the position or the start position of the frequency domain availability indicator in the DCI (that is, a position of a frequency domain availability indicator field)=positionInDCI-AI +position indicator size, where positionInDCI-AI is the position or the start position of the time domain availability indicator of the IAB DU in the DCI, and position indicator size is a size of the time domain availability indicator.

In another implementation, the position of the frequency domain availability indicator (that is, the first indicator) of the IAB DU in the DCI may be the position of the corresponding time domain availability indicator in the DCI. For example, as shown in FIG. 5c, the position or the start position of the frequency domain availability indicator in the DCI (that is, a position of a frequency domain availability indicator field)=positionInDCI-AI, where positionInDCI-AI is the position or the start position of the time domain availability indicator of the IAB DU in the DCI. In this implementation, positionInDCI-AI may be multiplexed without a need to define a new field position indicator.

Optionally, the parameter positionInDCI-AI carried in RRC may indicate a start position of a time domain availability indicator of a first cell in the DCI, and a position of a frequency domain availability indicator of the first cell in the DCI is after the time domain indicator. Alternatively, the parameter positionInDCI-AI carried in RRC indicates a time-frequency domain availability indicator of a first cell, and a size of the time-frequency domain availability indicator is max {ceil (log2(maxAIindex+1)), and 1} bits, where maxAIindex represents a maximum AI index.

Optionally, the method further includes:

determining the frequency domain availability of the DU of the IAB node according to the index that is of the frequency domain availability combination and that is indicated by the first indicator and a first mapping relationship, where the first mapping relationship is a mapping relationship between the index of the frequency domain availability combination and the frequency domain availability combination.

In this embodiment of this application, in a case that the first indicator indicates the index of the frequency domain availability combination, the IAB node may determine the frequency domain availability of the IAB DU according to the index that is of the frequency domain availability combination and that is indicated by the first indicator and the mapping relationship between the index of the frequency domain availability combination and the frequency domain availability combination, where the mapping relationship between the index of the frequency domain availability combination and the frequency domain availability combination may be configured by the CU or the parent IAB node by using RRC, or may be predefined by the protocol.

For example, the parent IAB node may configure a frequency domain availability combination list by using RRC, that is, the mapping relationship between the index of the frequency domain availability combination and the frequency domain availability combination, and the parent IAB node indicates the index of the frequency domain availability combination to the IAB node by using DCI. The IAB node searches the frequency domain availability combination list for the frequency domain availability combination according to the index that is of the frequency domain availability combination and that is indicated by the DCI, to determine the frequency domain availability.

Optionally, an indicator granularity of the frequency domain availability of the DU of the IAB node is determined according to at least one of the following:

a frequency domain availability indicator granularity indicated by F1-C or RRC or a MAC CE or DCI or a BAP control PDU;

a frequency domain availability indicator granularity predefined by the protocol;

a predefined mapping relationship between a bandwidth range of a DU of the parent IAB node of the IAB node and a frequency domain availability indicator granularity;

a predefined mapping relationship between a bandwidth range of the DU of the IAB node and a frequency domain availability indicator granularity;

a predefined mapping relationship between a configurable bandwidth range of a mobile termination MT of the IAB node and a frequency domain availability indicator granularity;

a size of the first indicator;

an available frequency domain resource of the DU of the IAB node;

an actually scheduled frequency domain resource of the DU of the IAB node; and a frequency range of a carrier of the DU of the IAB node.

In this embodiment of this application, in a case that the indicator granularity of the frequency domain availability of the DU of the IAB node is indicated by the parent IAB node, the parent IAB node may indicate the indicator granularity of the frequency domain availability to the IAB node by using RRC or a MAC CE or DCI. In a case that the indicator granularity of the frequency domain availability of the DU of the IAB node is indicated by the CU, the CU may indicate the indicator granularity of the frequency domain availability to the IAB node by using F1-C.

The configurable bandwidth range of the MT of the IAB node may also be referred to as a bandwidth part (Bandwidth Part, BWP) range of the IAB MT.

The determining the indicator granularity of the frequency domain availability of the IAB DU according to the available frequency domain resource or the actually scheduled frequency domain resource of the IAB DU may be determining the indicator granularity of the frequency domain availability of the IAB DU according to a size of the available frequency domain resource or the actually scheduled frequency domain resource of the IAB DU and/or a size of frequency domain availability indicator signaling. For example, if the available frequency domain resource or the actually scheduled frequency domain resource of the IAB DU is larger and the size of the indicator signaling keeps unchanged, the indicator granularity of the frequency domain availability of the IAB DU is larger.

For another example, a lower edge and an upward edge of a carrier or a BWP corresponds to 0, ¼, ½, ¾, and 1, that is, the frequency domain resource of the IAB DU is divided into four parts for indicator.

For the determining the indicator granularity of the frequency domain availability of the IAB DU according to the frequency range of the carrier of the IAB DU, specifically, different indicator granularities of frequency domain availability may be separately configured for different frequency ranges. In this way, the corresponding indicator granularity of the frequency domain availability may be determined according to the frequency range of the carrier of the IAB DU. For example, an IAB cluster cell includes a cell of an FR1 and a cell of an FR2, and therefore, corresponding indicator granularities of frequency domain availability may be separately configured for the cell of the FR1 and the cell of the FR2. It should be noted that, in addition to dividing by the FR1 and the FR2, there may be more division manners, for example, below 6 GHz, 6 GHz to 30 GHz, or 30 GHz to 100 GHz. A corresponding indicator granularity of frequency domain availability may be separately configured for each frequency range.

Optionally, an indicator granularity of the frequency domain availability of the DU of the IAB node is one of the following:

every N physical resource blocks (Physical Resource Block, PRB), where N is a positive integer;

every M resource block groups (Resource Block Group, RBG), where M is a positive integer;

every K carriers, where K is a positive integer; and every L subbands, where L is a positive integer.

In this embodiment of this application, a value of at least one of N, M, K, and L may be indicated by the parent IAB node or the CU, or may be predefined by the protocol.

Optionally, the parent IAB node may indicate the value of at least one of N, M, K, and L by using a MAC CE or DCI. The CU may indicate the value of at least one of N, M, K, and L by using F1-C.

The RBG may be obtained by grouping resource blocks (Resource Block, RB). Optionally, the RBG may be determined according to a bandwidth, that is, RB grouping is related to a bandwidth.

For example, a correspondence between a size of a resource block and a bandwidth may be predefined or preconfigured, so that the CU or the parent IAB node can obtain a size of indicator information according to a bandwidth and a correspondence between an indicator granularity/a resource group size and a bandwidth. Therefore, the IAB DU may obtain a frequency domain resource range according to the indicator information and the correspondence between the indicator granularity/resource group size and the bandwidth, and may further determine the frequency domain availability according to the frequency domain resource range and the indicator information.

It should be noted that a concept of the foregoing RBG may be the same as that of an RBG defined in Rel-16, or may be a newly defined resource block group. This is not limited in this embodiment of this application.

Optionally, the subband is determined according to an interference related parameter or a channel state information (Channel State Information, CSI) measurement parameter.

In this embodiment of this application, the subband (subband) may be related to the interference related parameter or the CSI measurement parameter. The interference related parameter may include but is not limited to at least one of an interference level, an interference threshold, and the like. The CSI measurement parameter may include but is not limited to at least one of a CSI measurement reference signal, a measurement threshold, a measurement time-frequency resource, and the like.

Optionally, a subcarrier spacing (Subcarrier Space, SCS) used to determine the frequency domain availability may include at least one of the following:

an SCS indicated by F1-C, RRC, a MAC CE, DCI, or a BAP control PDU;

an SCS corresponding to a time domain availability combination of the DU of the IAB node;

an SCS configured in an uplink resource configuration and/or a downlink resource configuration of the DU of the IAB node;

an SCS of a physical downlink control channel (Physical Downlink Shared Channel, PDCCH) or a synchronous signal block (Synchronous Signal Block, SSB) of a primary cell (Primary Cell, PCell) of the IAB node; and an SCS corresponding to a frequency range of a cluster cell of the IAB node.

In this embodiment of this application, the parent IAB node may indicate, to the IAB node by using RRC, a MAC CE, or DCI, the SCS used to determine the frequency domain availability. The CU may indicate, by using F1-C or a backhaul adaptation protocol control packet data unit, the SCS used to determine the frequency domain availability.

It should be noted that the SCS indicated by the foregoing F1-C, RRC, MAC CE, DCI, or BAP control PDU may be an SCS that is directly indicated by the F1-C, RRC, MAC CE, DCI, or backhaul adaptation protocol control packet data unit and that is used to determine the frequency domain availability, or may be an SCS corresponding to a parameter indicated by the F1-C, RRC, MAC CE, DCI, or backhaul adaptation protocol control packet data unit, for example, an SCS of an SSB or an SCS of a PDCCH of the DU of the parent IAB node.

The time domain availability combination may be the foregoing availabilityCombinations. The uplink resource configuration and/or the downlink resource configuration may be the foregoing IAB-DU-Resource-Configuration-TDD-Config.

For the SCS corresponding to the frequency range of the cluster cell of the IAB node, specifically, corresponding SCSs may be separately configured for cluster cells of different frequency ranges, for example, corresponding SCSs are separately configured or predefined for a cell of an FR1 and a cell of an FR2. Optionally, if the cell of the FR1 and the cell of the FR2 have a PCell or a primary secondary cell (Primary Secondary Cell, PSCell), reference is made to an SCS of an SSB or a PDCCH of the PCell or the PSCell; otherwise, reference is made to an SCS of an SSB or a PDCCH of a specified cell (for example, a cell with a lowest frequency). It should be noted that, in addition to dividing by the FR1 and the FR2, there may be more division manners, for example, below 6 GHz, 6 GHz to 30 GHz, or 30 GHz to 100 GHz. A corresponding SCS is separately configured for a cell of each frequency range.

Optionally, in a case that the uplink resource configuration and/or the downlink resource configuration are/is configured with at least two SCSs, the SCS used to determine the frequency domain availability is one of the following:

a maximum SCS in the at least two SCSs;

a minimum SCS in the at least two SCSs; and an SCS of a synchronization signal block of a primary cell in the at least two SCSs.

In this embodiment of this application, in a case that there are a plurality of uplink resource configurations and/or downlink resource configurations (IAB-DU-Resource-Configuration-TDD-Config) and the plurality of uplink resource configurations and/or downlink resource configurations provide different SCS configurations, for example, a scenario in which the MT corresponding to the IAB is in a dual-connected state, an SCS configuration used to determine the frequency domain availability may be a maximum SCS configuration or a minimum SCS configuration or an SCS configuration of the SSB of the PCell in the different SCS configurations. In a case that the uplink resource configuration and/or the downlink resource configuration provide a plurality of SCS configurations, an SCS configuration used to determine the frequency domain availability may be a maximum SCS configuration or a minimum SCS configuration or an SCS configuration of the SSB of the PCell in the plurality of SCS configurations.

Optionally, in a case that an MT of the IAB node and/or the DU of the IAB node are/is configured with at least two SCSs, an SCS used to determine the frequency domain availability is one of the following:

an SCS of a primary cell;

an SCS of a primary secondary cell;

a maximum SCS in the at least two SCSs;

a minimum SCS in the at least two SCSs;

an SCS of a PDCCH or an SSB of a primary cell of a primary cell group;

an SCS of a PDCCH or an SSB of a reference cell of the primary cell group; and an SCS of a PDCCH or an SSB of a reference cell of a secondary cell group.

In this embodiment of this application, in a case that the MT of the IAB node and/or the DU of the IAB node are/IS configured with at least two SCSs, for example, in a scenario in which the MT of the IAB is in a dual-connected state, the SCS used to determine the frequency domain availability may be the SCS of the PCell or the PSCell, or the maximum or minimum SCS, or the SCS of the PDCCH or the SSB of the PCell of the MCG or the SCS of the PDCCH or the SSB of the reference cell of the MCG, or the SCS of the PDCCH or the SSB of the reference cell of the SCG.

Optionally, the first indicator is determined according to at least one of the following:

a time domain resource configuration;

a frequency domain resource configuration;

a resource multiplexing mode of the DU and an MT of the IAB node; and a duplex mode of the DU and the MT of the IAB node.

In an implementation, the frequency domain availability of the IAB DU may be related to the time domain resource configuration, and the time domain resource configuration may include an availability configuration of a time domain resource. Specifically, the parent IAB node or the CU may configure availability of a frequency domain resource according to the time domain resource configuration, that is, configure content indicated by the first indicator.

For example, frequency domain availability is configured for a resource whose time domain availability is configured as a soft type, that is, the first indicator is used to indicate the frequency domain availability of the resource whose time domain availability is configured as the soft type, or the first indicator is applied to the resource whose time domain availability is configured as the soft type.

In another implementation, the frequency domain availability of the IAB DU may be related to the frequency domain resource configuration. Optionally, the parent IAB node or the CU may further indicate availability of a frequency domain resource of the DU of the IAB node in a case that the availability of the frequency domain resource of the DU of the IAB node is configured. For example, the CU may send a third indicator by using F1-C to configure the availability of the frequency domain resource of the DU of the IAB node, and the parent IAB node may send the first indicator by using DCI or a MAC CE to indicate that the availability of the frequency domain resource corresponding to the frequency domain availability is configured in an available resource of the DU of the IAB node.

For another example, the parent IAB node may further indicate frequency domain availability for a resource whose frequency domain availability is configured as a soft type, that is, the first indicator is used to indicate the frequency domain availability of the resource whose frequency domain availability is configured as the soft type, or the first indicator is applied to the resource whose frequency domain availability is configured as the soft type.

For example, an availability type of the frequency domain resource of the DU may include at least one of a hard (hard) type, a soft (soft) type, an NA type, and a shared (Shared) type. The frequency domain resource of the DU may be configured as different availability types. For a frequency domain resource whose frequency domain availability is configured as a soft type, the parent IAB node or the CU may further indicate its availability.

In another implementation, the frequency domain availability of the IAB DU may be related to a resource multiplexing mode, and the resource multiplexing mode may include at least one of TDM, FDM, SDM, and the like. Specifically, the parent IAB node or the CU may configure availability of a frequency domain resource according to the resource multiplexing mode, that is, configure content indicated by the first indicator. For example, frequency domain availability is configured for a resource whose resource multiplexing mode is TDM, that is, the first indicator is used to indicate frequency domain availability of a resource of the DU and the MT in the resource multiplexing mode TDM, or the first indicator is applied to a resource of the DU and the MT in the resource multiplexing mode TDM, or an effective time of the first indicator is a time at which the DU and the MT are in the resource multiplexing mode TDM.

Optionally, signaling that carries the first indicator may carry indicator information indicating the resource multiplexing mode for which the first indicator is directed.

In another implementation, the frequency domain availability of the IAB DU may be related a duplex mode. The duplex mode may include at least one of MT TX/DU TX, MT TX/DU RX, MT RX/DU RX, MT RX/DU TX, only MT TX (only MT TX), only MT RX (only MT RX), only DU TX (only DU TX), and only DU RX (only DU RX). Specifically, the parent IAB node or the CU may configure availability of a frequency domain resource according to the duplex mode, that is, configure content indicated by the first indicator. For example, frequency domain availability is configured for a resource whose duplex mode is DU-TX & MT-TX, that is, the first indicator is used to indicate frequency domain availability of a resource of the DU and the MT in the duplex mode DU-TX & MT-TX, or the first indicator is applied to a resource of the DU and the MT in the duplex mode DU-TX & MT-TX, or an effective time of the first indicator is a time at which the DU and the MT are in the duplex mode DU-TX & MT-TX.

Optionally, signaling that carries the first indicator may carry indicator information indicating the duplex mode for which the first indicator is directed.

Optionally, the first indicator is applied to at least one of the following:

a resource for which a soft type is configured in time domain;

a resource for which a hard type is configured in time domain;

a resource for which a not available type is configured in time domain;

a resource for which an uplink type is configured in time domain;

a resource for which a downlink type is configured in time domain;

a resource for which a flexible type is configured in time domain; and a resource corresponding to each slot or each symbol.

The first indicator is applied to the resource for which the soft type is configured in time domain, that is, the first indicator is used to indicate time domain availability of the resource for which the soft type is configured in time domain. Specifically, the parent IAB node or the CU may configure frequency domain availability for the resource for which the soft type is configured in time domain.

The first indicator is applied to the resource for which the hard type is configured in time domain, that is, the first indicator is used to indicate time domain availability of the resource for which the hard type is configured in time domain. Specifically, the parent IAB node or the CU may configure frequency domain availability for the resource for which the hard type is configured in time domain.

The first indicator is applied to the resource for which the not available type is configured in time domain, that is, the first indicator is used to indicate time domain availability of the resource for which the not available type is configured in time domain. Specifically, the parent IAB node or the CU may configure frequency domain availability for the resource for which the not available type is configured in time domain.

The first indicator is applied to the resource for which the DL type is configured in time domain, that is, the first indicator is used to indicate time domain availability of the resource for which the DL type is configured in time domain. Specifically, the parent IAB node or the CU may configure frequency domain availability for the resource for which the DL type is configured in time domain.

The first indicator is applied to the resource for which the UL type is configured in time domain, that is, the first indicator is used to indicate time domain availability of the resource for which the UL type is configured in time domain. Specifically, the parent IAB node or the CU may configure frequency domain availability for the resource for which the UL type is configured in time domain.

The first indicator is applied to the resource for which the flexible type is configured in time domain, that is, the first indicator is used to indicate time domain availability of the resource for which the flexible type is configured in time domain. Specifically, the parent IAB node or the CU may configure frequency domain availability for the resource for which the flexible type is configured in time domain.

The first indicator is applied to the resource corresponding to each slot or each symbol, that is, the first indicator is used to indicate time domain availability of the resource corresponding to each slot or each symbol. Specifically, the parent IAB node or the CU may configure frequency domain availability for each slot or each symbol.

Optionally, the first indicator may be applied to a resource for which a soft type and a flexible type are configured in time domain, that is, the first indicator may be used to indicate frequency domain availability of the resource for which the soft type and the flexible type are configured in time domain.

Optionally, an effective time of the first indicator is determined according to at least one of the following:

a predefined effective time domain parameter of the first indicator; and an indicated or configured effective time domain parameter of the first indicator.

In this embodiment of this application, the effective time may be understood as an effective time window, and may include an effective start moment and an effective end moment.

The indicated or configured effective time domain parameter of the first indicator may be an effective time domain parameter that is of the first indicator and that is indicated by F1-C, RRC, a MAC CE, or DCI. The time domain parameter may include but is not limited to at least one of an effective period, a time domain offset, a time domain resource size, a frequency domain resource size, a frequency domain resource position (including a start point and an end point), and the like.

Optionally, the time domain parameter may include at least one of the following: an effective period, a time domain offset, and a time domain resource size.

The time domain offset may represent an offset between an effective start moment of the first indicator and a reference moment. The time domain offset may be a fixed value, or may be a variable value. The reference moment may be a receiving moment of the first indicator, or a time point determined according to a receiving moment of the first indicator.

For example, if the receiving moment of the first indicator is a symbol or a sub-slot (sub-slot) or a slot (slot) of a DU cell, the effective start moment of the first indicator may be S symbols or sub-slots or slots after the symbol or sub-slot or slot, and S is the foregoing time domain offset.

The time domain resource size may include a quantity of lots, a quantity of symbols, and the like.

For example, it is preconfigured that a frequency domain availability indicator takes effect over a time domain resource of 10 slots. If the IAB node receives an indicator from the parent IAB node that the IAB DU is of a hard type in a slot P, frequency domain availability of the IAB DU is of the hard type in a range from the slot P to a slot P+9 in a corresponding frequency domain range, and scheduling is performed according to the type of the frequency domain availability, where P is a positive integer. That is, it is assumed that the DU continuously occupies a segment of resources for transmission, to reduce a frequency domain availability indicator on each time domain unit (for example, a slot), thereby saving overheads of indicator signaling.

Optionally, the effective time of the first indicator may also be determined according to a frequency domain parameter. The frequency domain parameter may include at least one of a frequency domain resource size, a frequency domain resource position, and the like. The frequency domain resource position may include a start position and an end position of a frequency domain resource.

For example, it is preconfigured that a frequency domain availability indicator takes effect over a frequency domain resource of 20 PRB s. If the IAB node receives an indicator from the parent IAB node or the CU that the IAB DU is of a soft type on the $Q^{th}$ PRB, resources of the IAB DU are of the soft type from the $Q^{th}$ PRB to the $(Q+19)^{th}$ PRB on the frequency domain resource, and the IAB performs scheduling according to the configured type of the frequency domain availability, where P is a positive integer.

Optionally, the method may further include:

receiving a second indicator, where the second indicator is used to indicate at least one of a size and a position of an available frequency domain of the DU of the IAB node.

In this embodiment of this application, the parent IAB node or the CU may indicate at least one of the size and the position of the available frequency domain of the IAB DU to the IAB node.

For example, the IAB node is configured with a plurality of DU cells, and the parent IAB node may directly and dynamically indicate that some cells in the plurality of DU cells are available cells of the DU.

For another example, for a cell configured for the IAB DU, the parent IAB node may directly and dynamically indicate that some frequency domain resources in the cell are available resources of the DU.

For another example, for a cell configured for the IAB DU, if some resources in the cell are configured as semi-static available resources of the DU, the parent IAB node may dynamically indicate that some resources in the semi-static available resources are actual available resources of the DU.

It should be noted that the actual available resources of the DU may be an intersection set or a union set of a semi-statically configured resource and a dynamically indicated resource.

Optionally, the frequency domain availability of the DU of the IAB node is determined according to at least one of the following:

a frequency domain resource of the DU of the IAB node;

a resource multiplexing mode of the DU and an MT of the IAB node; and a duplex mode of the DU and the MT of the IAB node.

In an implementation, the frequency domain availability of the DU of the IAB node may be determined according to the frequency domain resource of the DU of the IAB node. Optionally, the frequency domain availability of the DU of the IAB node may be determined according to the frequency domain resource of the DU of the IAB node and a frequency domain resource of the MT of the IAB node. For example, if the frequency domain resource of the MT overlaps the frequency domain resource of the DU, availability of the frequency domain resource of the DU is a soft type, or availability of the frequency domain resource of the overlapping part is a soft type.

In another implementation, the frequency domain availability of the DU of the IAB node may be determined according to the resource multiplexing mode of the DU and the MT of the IAB node, where the resource multiplexing mode may include at least one of TDM, FDM, SDM, and the like. Specifically, different resource multiplexing modes may respectively correspond to different frequency domain availability types, for example, FDM corresponds to a soft type, TDM corresponds to an NA type, and SDM corresponds to a hard type. In this way, the IAB node may determine the frequency domain availability of the corresponding DU based on the current resource multiplexing mode of the DU and the MT.

In another implementation, the frequency domain availability of the DU of the IAB node may be determined according to the duplex mode of the DU and the MT of the IAB node. The duplex mode may include at least one of MT TX/DU TX, MT TX/DU RX, MT RX/DU RX, MT RX/DU TX, only MT TX (only MT TX), only MT RX (only MT RX), only DU TX (only DU TX), and only DU RX (only DU RX). Specifically, different duplex modes may respectively correspond to different frequency domain availability types, for example, DU-TX & MT-TX correspond to a soft type, DU-RX & MT-RX correspond to an NA type, and DU-TX & MT-RX correspond to a hard type. In this way, the IAB node may determine the frequency domain availability of the corresponding DU based on the current duplex mode of the DU and the MT.

Optionally, time-frequency resource availability of the DU of the IAB node may be determined according to time domain availability and frequency domain availability of the DU of the IAB node.

For example, if a type of the time domain availability of the DU of the IAB node is the same as a type of the frequency domain availability, a type of the time-frequency resource availability of the DU of the IAB node is the same type. If the type of the time domain availability of the DU of the IAB node is different from the type of the frequency domain availability, the type of the time-frequency resource availability of the DU of the IAB node may be the type of the time domain availability of the DU of the IAB node or the type of the frequency domain availability of the IAB node.

Optionally, for a time-frequency resource of a soft type, if the DU may determine in advance that the time-frequency resource is not used by the MT, the time-frequency resource may be an available resource of the DU.

Optionally, if the time domain availability of the DU of the IAB node is a soft type and the frequency domain availability is a soft type, the corresponding time-frequency resource availability is a soft type;

if the time domain availability of the DU of the IAB node is a hard type and the frequency domain availability is a soft type, the corresponding time-frequency resource availability is a soft type;

if the time domain availability of the DU of the IAB node is a soft type and the frequency domain availability is a hard type, the corresponding time-frequency resource availability is a soft type; and if the time domain availability of the DU of the IAB node is a soft type and the frequency domain availability is a shared type, the corresponding time-frequency resource availability is a soft type.

Optionally, the method may further include:

reporting a frequency domain resource parameter, where the frequency domain resource parameter includes at least one of the following: a frequency domain resource boundary, a frequency domain resource range, a frequency domain resource size, and expected frequency domain resource availability.

In this embodiment of this application, the IAB node may report the frequency domain resource parameter to the parent IAB node or the CU. Optionally, the IAB node may report the frequency domain resource parameter to the parent IAB node or the CU by using assistant information (Assistant Information), a MAC CE, or a BAP control PDU.

Optionally, a reporting mode of the frequency domain resource parameter includes one of the following: periodic reporting, event trigger reporting, and poll (poll) trigger reporting.

Referring to FIG. 6, FIG. 6 is a flowchart of another information transmission method according to an embodiment of this application. The method is performed by a network device. As shown in FIG. 6, the method includes the following steps.

Step 601: Indicate frequency domain availability of a DU of an IAB node to the IAB node.

In this embodiment of this application, the network device may be a parent IAB node of the IAB node, or may be a CU. For example, the parent IAB node may indicate the frequency domain availability of the DU of the IAB node by using DCI, a MAC CE, RRC, or the like; or the CU may indicate the frequency domain availability of the DU of the IAB node by using F1-C, a BAP control PDU, or the like.

It should be noted that this embodiment is used as an implementation of the network device corresponding to the embodiment shown in FIG. 4. For a specific implementation of this embodiment, refer to the related descriptions of the embodiment shown in FIG. 4. A same beneficial effect can also be achieved. To avoid repeated descriptions, details are not described again herein.

According to the information transmission method provided in this embodiment of this application, frequency domain availability of a DU of an IAB node is indicated to the IAB node, so that the IAB node can perform information transmission based on the frequency domain availability of the DU of the IAB node, thereby reducing interference between IAB nodes or within an IAB node.

Optionally, the indicating frequency domain availability of a DU of an IAB node to the IAB node includes:

sending a first indicator to the IAB node, where the first indicator is used to indicate at least one of the following:

the frequency domain availability of the DU of the IAB node;

a mapping relationship between an index of a frequency domain availability combination and the frequency domain availability combination;

the frequency domain availability combination; and the index of the frequency domain availability combination.

For an implementation of this embodiment, refer to the related descriptions of the embodiment shown in FIG. 4. Details are not described herein again.

Optionally, the first indicator is further used to indicate time domain availability of the DU of the IAB node.

For an implementation of this embodiment, refer to the related descriptions of the embodiment shown in FIG. 4. Details are not described herein again.

Optionally, the network device is a parent IAB node of the IAB node, and the first indicator is carried in downlink control information DCI or a Media Access Control control element MAC CE or radio resource control RRC.

In this embodiment of this application, the parent IAB node of the IAB node may send the first indicator to the IAB node by using DCI, a MAC CE, or RRC.

Optionally, a position and/or a size of the first indicator in the DCI is configured by RRC.

For an implementation of this embodiment, refer to the related descriptions of the embodiment shown in FIG. 4. Details are not described herein again.

Optionally, the position of the first indicator in the DCI is determined according to a position of a time domain availability indicator of the DU of the IAB node in the DCI.

For an implementation of this embodiment, refer to the related descriptions of the embodiment shown in FIG. 4. Details are not described herein again.

Optionally, the position of the first indicator in the DCI is one of the following:

a position obtained after a position, in the DCI, of a last time domain availability indicator in the DCI is shifted by a first offset value, where the first offset value is an offset value of a frequency domain availability indicator;

a position obtained after the position of the time domain availability indicator of the DU of the IAB node in the DCI is shifted by a second offset value, where the second offset value is a size of the time domain availability indicator; and the position of the time domain availability indicator of the DU of the IAB node in the DCI.

For an implementation of this embodiment, refer to the related descriptions of the embodiment shown in FIG. 4. Details are not described herein again.

Optionally, the network device is a CU, and the first indicator is carried in F1-C signaling or a backhaul adaptation protocol control packet data unit.

In this embodiment of this application, the CU may send the first indicator to the IAB node by using F1-C signaling or a BAP control PDU.

Optionally, the method may further include at least one of the following:

indicating an indicator granularity of the frequency domain availability to the IAB node; and indicating, to the IAB node, an SCS used to determine the frequency domain availability.

In this embodiment of this application, the parent IAB node of the IAB node may indicate the indicator granularity of frequency domain availability to the IAB node by using DCI or a MAC CE or RRC, or may indicate the indicator granularity of the frequency domain availability of the DU of the IAB node to the IAB node by using F1-C signaling or a BAP control PDU.

Similarly, the parent IAB node of the IAB node may indicate, by using DCI or a MAC CE or RRC, the SCS used to determine the frequency domain availability to the IAB node, or may indicate, by using F1-C signaling or a BAP control PDU, the SCS used to determine the frequency domain availability to the IAB node.

Optionally, an indicator granularity of the frequency domain availability of the DU of the IAB node is determined according to at least one of the following:

a frequency domain availability indicator granularity predefined by the protocol;

a predefined mapping relationship between a bandwidth range of a DU of the parent IAB node of the IAB node and a frequency domain availability indicator granularity;

a predefined mapping relationship between a bandwidth range of the DU of the IAB node and a frequency domain availability indicator granularity;

a predefined mapping relationship between a configurable bandwidth range of a mobile termination MT of the IAB node and a frequency domain availability indicator granularity;

a size of the first indicator;

an available frequency domain resource of the DU of the IAB node;

an actually scheduled frequency domain resource of the DU of the IAB node; and a frequency range of a carrier of the DU of the IAB node.

For an implementation of this embodiment, refer to the related descriptions of the embodiment shown in FIG. 4. Details are not described herein again.

Optionally, an indicator granularity of the frequency domain availability of the DU of the IAB node is one of the following:

every N physical resource blocks PRBs, where N is a positive integer;

every M resource block groups RBGs, where M is a positive integer;

every K carriers, where K is a positive integer; and every L subbands, where L is a positive integer.

For an implementation of this embodiment, refer to the related descriptions of the embodiment shown in FIG. 4. Details are not described herein again.

Optionally, the RBG is determined based on a bandwidth.

For an implementation of this embodiment, refer to the related descriptions of the embodiment shown in FIG. 4. Details are not described herein again.

Optionally, the subband is determined according to an interference related parameter or a channel state information CSI measurement parameter.

For an implementation of this embodiment, refer to the related descriptions of the embodiment shown in FIG. 4. Details are not described herein again.

Optionally, an SCS used to determine the frequency domain availability includes one of the following:

an SCS corresponding to a time domain availability combination of the DU of the IAB node;

an SCS configured in an uplink resource configuration and/or a downlink resource configuration of the DU of the IAB node;

an SCS of a PDCCH or an SSB of a primary cell of the IAB node; and an SCS corresponding to a frequency range of a cluster cell of the IAB node.

For an implementation of this embodiment, refer to the related descriptions of the embodiment shown in FIG. 4. Details are not described herein again.

Optionally, in a case that the uplink resource configuration and/or the downlink resource configuration are/is configured with at least two SCSs, the SCS used to determine the frequency domain availability is one of the following:

a maximum SCS in the at least two SCSs;

a minimum SCS in the at least two SCSs; and an SCS of a synchronization signal block of a primary cell in the at least two SCSs.

For an implementation of this embodiment, refer to the related descriptions of the embodiment shown in FIG. 4. Details are not described herein again.

Optionally, in a case that an MT of the IAB node and/or the DU of the IAB node are/is configured with at least two SCSs, an SCS used to determine the frequency domain availability is one of the following:

an SCS of a primary cell;

an SCS of a primary secondary cell;

a maximum SCS in the at least two SCSs;

a minimum SCS in the at least two SCSs;

an SCS of a PDCCH or an SSB of a primary cell of a primary cell group;

an SCS of a PDCCH or an SSB of a reference cell of the primary cell group; and an SCS of a PDCCH or an SSB of a reference cell of a secondary cell group.

For an implementation of this embodiment, refer to the related descriptions of the embodiment shown in FIG. 4. Details are not described herein again.

Optionally, the first indicator is determined according to at least one of the following:

a time domain resource configuration; and a resource multiplexing mode of the DU and an MT of the IAB node.

Optionally, the first indicator is applied to at least one of the following:

a resource for which a soft type is configured in time domain;

a resource for which a hard type is configured in time domain;

a resource for which a not available type is configured in time domain;

a resource for which an uplink type is configured in time domain;

a resource for which a downlink type is configured in time domain;

a resource for which a flexible type is configured in time domain; and a resource corresponding to each slot or each symbol.

For an implementation of this embodiment, refer to the related descriptions of the embodiment shown in FIG. 4. Details are not described herein again.

Optionally, the method further includes:

sending, to the IAB node, an effective time domain parameter of the first indicator.

In this embodiment of this application, the parent IAB node of the IAB node may send the effective time domain parameter of the first indicator to the IAB node by using DCI or a MAC CE or RRC, or the CU may send the effective time domain parameter of the first indicator to the IAB node by using F1-C signaling or a BAP control PDU.

Optionally, the time domain parameter includes at least one of the following: an effective period, a time domain offset, and a time domain resource size.

For an implementation of this embodiment, refer to the related descriptions of the embodiment shown in FIG. 4. Details are not described herein again.

Optionally, the method further includes:

sending a second indicator, where the second indicator is used to indicate at least one of a size and a position of an available frequency domain of the DU of the IAB node.

In this embodiment of this application, the parent IAB node of the IAB node may send the second indicator to the IAB node by using DCI or a MAC CE or RRC, or the CU may send the second indicator to the IAB node by using F1-C signaling or a BAP control PDU.

For an implementation of this embodiment, refer to the related descriptions of the embodiment shown in FIG. 4. Details are not described herein again.

Optionally, the frequency domain availability of the DU of the IAB node is determined according to at least one of the following:

a frequency domain resource of the DU of the IAB node;

a resource multiplexing mode of the DU and an MT of the IAB node; and a duplex mode of the DU and the MT of the IAB node.

For an implementation of this embodiment, refer to the related descriptions of the embodiment shown in FIG. 4. Details are not described herein again.

Optionally, time-frequency resource availability of the DU of the IAB node is determined according to time domain availability and frequency domain availability of the DU of the IAB node.

For an implementation of this embodiment, refer to the related descriptions of the embodiment shown in FIG. 4. Details are not described herein again.

Optionally, if the time domain availability of the DU of the IAB node is a soft type and the frequency domain availability is a soft type, the corresponding time-frequency resource availability is a soft type;

if the time domain availability of the DU of the IAB node is a hard type and the frequency domain availability is a soft type, the corresponding time-frequency resource availability is a soft type;

if the time domain availability of the DU of the IAB node is a soft type and the frequency domain availability is a hard type, the corresponding time-frequency resource availability is a soft type; and if the time domain availability of the DU of the IAB node is a soft type and the frequency domain availability is a shared type, the corresponding time-frequency resource availability is a soft type.

Optionally, the method further includes:

receiving a frequency domain resource parameter reported by the IAB node, where the frequency domain resource parameter includes at least one of the following: a frequency domain resource boundary, a frequency domain resource range, a frequency domain resource size, and expected frequency domain resource availability.

For an implementation of this embodiment, refer to the related descriptions of the embodiment shown in FIG 4. Details are not described herein again.

Optionally, a reporting mode of the frequency domain resource parameter includes one of the following: periodic reporting, event trigger reporting, and poll trigger reporting.

For ease of understanding, the following describes the information transmission method provided in the embodiments of this application with reference to examples.

Example 1: Time domain availability multiplexes DCI format 2_5 signaling, and frequency domain availability and time domain availability are separately indicated in DCI. This solution can be compatible with R16 UE.

Specifically, for each IAB node, or each cell (cell) of the IAB DU, the following some or all information may be provided:

an identifier of an IAB DU serving cell (iabDuCellId-AI);

a position (FreqPositionInDCI-AI) of a frequency domain availability indicator in DCI format 2_5; and a set of frequency domain availability combination indicators (FreqAvailabilityCombinations), where each frequency domain availability combination indicator includes:

a frequency domain resource availability indicator (FreqResourceAvailability); and mapping between an availability combination of a frequency domain resource of a soft type or an availability combination of some or all frequency domain resources provided by a frequency domain resource availability indicator (FreqResourceAvailability) and a corresponding AI index field value of DCI format 2_5 provided by a frequency domain availability combination identifier (FreqAvailabilityCombinationId), where a corresponding frequency domain resource availability indicator may be found according to FreqAvailabilityCombinationId indicated in DCI and a mapping relationship configured by FreqAvailabilityCombinations.

The frequency domain resource availability indicator (FreqResourceAvailability) is used to indicate availability of a frequency domain resource. Optionally, a frequency domain resource availability indicator may be configured for some or all frequency domain resources of a soft type; or a frequency domain resource availability indicator is configured for some or all frequency domain resources, that is, this is not limited to a frequency domain resource of a soft type; or a frequency domain resource availability indicator is separately configured for a frequency domain resource of each resource type (that is, hard/soft/NA); or a frequency domain resource availability indicator is separately configured for each multiplexing mode (that is, MT TX/DU TX, MT RX/DU RX, MT TX/DU RX, MT RX/DU TX, and TDM); or a frequency domain resource availability indicator is separately configured for each link direction (that is, UL/DL/Flexible); or a frequency domain resource availability indicator is separately configured for each slot or each symbol.

It should be noted that if the frequency domain resource availability indicator is applied to the frequency domain resource of the soft type, that is, is used to indicate availability of the frequency domain resource of the soft type, it indicates that a frequency domain resource availability indicator in the DCI overrides only a resource that is preconfigured as the soft type in frequency domain, and a resource that is configured as a hard/NA type is not overridden. If the frequency domain resource availability indicator is applied to some or all resources, and frequency domain resource availability preconfigured in frequency domain is not considered, the frequency domain resource availability indicator in the DCI may override resource availability of the hard/NA type.

The IAB-DU assumes that a frequency domain availability combination indicator (FreqAvailabilityCombinations) or a frequency domain availability indicator uses a same SCS configuration as a time domain availability combination indicator (availabilityCombinations); or an SCS configuration provided by an IAB-DU uplink/downlink configuration (IAB-DU-Resource-Configuration-TDD-Config); or a maximum or minimum SCS configuration when a plurality of IAB-DU uplink/downlink configurations provide different SCS configurations (which may correspond to a case that the MT is in a dual-connected state); or a maximum or a minimum SCS when a plurality of time domain availability combination indicators (availabilityCombinations) (which may correspond to a case that the MT is in a dual-connected state) correspond to different SCS configurations.

The position of the frequency domain availability indicator in the DCI may be one of the following three manners.

Manner 1: The position of the frequency domain availability indicator in the DCI may be after a position of the last time domain availability indicator in the DCI, as shown in FIG. 5a.

Manner 2: The position of the frequency domain availability indicator in the DCI may be after a position of the corresponding time domain availability indicator in the DCI, as shown in FIG. 5b.

Manner 3: The position of the frequency domain availability indicator in the DCI may be the position of the corresponding time domain availability indicator in the DCI, as shown in FIG. 5c.

It should be noted that, in comparison with Manner 1 and Manner 2, in the foregoing Manner 3, only one indicator positionInDCI may be configured in the RRC configuration. The frequency domain availability indicator carried in DCI Format 2_5 may be FreqAvailabilityCombinationId-r17.

For indicating frequency domain availability of a cell (cell) by using RRC signaling, a corresponding RRC signaling configuration may be one of the following solutions:

Solution 1: The frequency domain availability indicator and the time domain availability indicator may use a same information element (Information Element, IE).

Some fields in the IE may be shared by the time domain availability indicator and the frequency domain availability indicator, for example, availabilityCombinationsPerCellIndex. A field positionInDCI-AI may be shared by the time domain availability indicator and the frequency domain availability indicator, or a new field position indicator may be defined. When no new field position indicator is provided, a frequency domain indicator position may be determined according to positionInDCI-AI, for example, frequency domain available resource indicator field position=positionInDCI-AIlast+position indicator size, where positionInDCI-AIlast is a position or a start position of the last time domain availability indicator in the DCI, and position indicator size is a size of the time domain availability indicator. An existing field AvailabilityCombinationsPerCellIndex is a common index of a set of available resources in time domain and frequency domain.

Optionally, an optional implementation code of the RRC configuration may be as follows:

```
AvailabilityCombinationsPerCell information element
-- ASN1START
-- TAG-AVAILABILITYCOMBINATIONSPERCELL-START
AvailabilityCombinationsPerCell-r16 ::=                    SEQUENCE {
    availabilityCombinationsPerCellIndex-r16
AvailabilityCombinationsPerCellIndex-r16,
    iab-DU-CellIdentity-r16                          CellIdentity,
    positionInDCI-AI-r16                    INTEGER(0..maxAI-DCI-PayloadSize-r16-1)
OPTIONAL, -- Need M
    FreqPositionInDCI-AI-r17
INTEGER(0 .. maxAI-DCI-PayloadSize-r16-1)                    OPTIONAL, -- Need M
    availabilityCombinations-r16                            SEQUENCE (SIZE
(1..maxNrofAvailabilityCombinationsPerSet-r16)) OF AvailabilityCombination-r16,
    FreqAvailabilityCombinations-r17                          SEQUENCE (SIZE
(1..maxNrofFreqAvailabilityCombinationsPerSet-r17)) OF FreqAvailabilityCombination-r17,
    ...
}
    AvailabilityCombinationsPerCellIndex-r16                            ::=
INTEGER(0..maxNrofDUCells-r16)
    AvailabilityCombination-r16 ::=             SEQUENCE {
        availabilityCombinationId-r16                    AvailabilityCombinationId-r16,
        resource Availability-r16                          SEQUENCE (SIZE
(1. maxNrofResourceAvailabilityPerCombination-r16)) OF INTEGER (0..7)
}
```

-continued

```
FreqAvailabilityCombination-r17 ::=                 SEQUENCE {
    FreqAvailabilityCombinationId-r17                  FreqAvailabilityCombinationId-r17,
    FreqResource Availability-r17                          SEQUENCE (SIZE
(1..maxNrofFreqResourceAvailabilityPerCombination-r17)) OF INTEGER (0..N)
}
    AvailabilityCombinationId-r16          ::=          INTEGER
(0..maxNrofAvailabilityCombinationsPerSet-r16-1)
    FreqAvailabilityCombinationId-r17          ::=          INTEGER
(0..maxNrofFreqAvailabilityCombinationsPerSet-r17-1)
    -- TAG-AVAILABILITYCOMBINATIONSPERCELL-STOP
    -- ASN1STOP
```

It should be noted that if the frequency domain availability indicator is carried in DCI format 2-5, a maximum value in FreqPositionInDCI-AI-r17 may also be defined as maxAI-DCI-PayloadSize-R17, where maxAI-DCI-Payload-Size-R17=maxAI-DCI-PayloadSize-R16. If the frequency domain availability indicator is indicated by using new DCI (for example, downlink control information (Downlink Control Information, DCI) format 2_7 (format 2_7) (DCI format 2_7)), a maximum value in FreqPositionInDCI-AI-r17 may be defined as maxAI-DCI-PayloadSize-R17. A value of maxAI-DCI-PayloadSize-R17 is not required to be the same as that in a configuration of maxAI-DCI-PayloadSize-R16. maxAI-DCI-PayloadSize-R17 represents a size of maximum DCI for indicating availability as defined in a protocol release 17 (Release 17, Rel-17), and maxAI-DCI-Payload-Size-R16 represents a size of maximum DCI for indicating availability as defined in a protocol Rel-16.

Solution 2: Frequency domain availability is indicated by using an independent RRC IE.

Optionally, an optional implementation code of the RRC configuration may be as follows:

not required to be the same as that in a configuration of maxAI-DCI-PayloadSize-R16.

Example 2: One-level frequency domain availability indicator is embedded in the time domain availability indicator.

For each IAB node or each cell of the IAB DU, some or all of the following information is provided:
    an identifier of an IAB DU serving cell (iabDuCellId-AI);
    a position (FreqPositionInDCI-AI) of a time domain availability indicator in DCI format 2_5;
    a position (FreqpositionInDCI-AI) of a frequency domain availability indicator in DCI format 2_5;
    a set of time domain availability combination (AvailabilityCombinations), where each time domain availability combination includes:
    a time domain availability indicator (resourceAvailability), used to indicate availability of symbol resources of a soft type in one or more slots;
    mapping between a soft-type symbol availability combination provided by a time domain availability indicator (resourceAvailability) and a corresponding availability indicator (Availability Indicator, AI) index field value

```
FreqAvailabilityCombinationsPerCell information element
-- ASN1START
-- TAG-AVAILABILITYCOMBINATIONSPERCELL-START
FreqAvailabilityCombinationsPerCell-r17 ::=          SEQUENCE {
    FreqAvailabilityCombinationsPerCellIndex-r17
FreqAvailabilityCombinationsPerCellIndex-r17,
    iab-DU-CellIdentity-r17          CellIdentity,
    FreqPositionInDCI-AI-r17
INTEGER(0..maxAI-DCI-PayloadSize-r17-1)          OPTIONAL, -- Need M
    FreqAvailabilityCombinations-r17                SEQUENCE (SIZE
(1..maxNrofFreqAvailabilityCombinationsPerSet-r17)) OF FreqAvailabilityCombination-r17,
    ...
}
    FreqAvailabilityCombinationsPerCellIndex-r17          ::=
INTEGER(0..maxNrofDUCells-r17)
    FreqAvailabilityCombination-r17 ::=          SEQUENCE {
    FreqAvailabilityCombinationId-r17                  FreqAvailabilityCombinationId-r17,
    FreqResourceAvailability-r17                          SEQUENCE (SIZE
(1..maxNrofFreqResourceAvailabilityPerCombination-r17)) OF INTEGER (0..N)
}
    FreqAvailabilityCombinationId-r17          ::=          INTEGER
(0..maxNrofFreqAvailabilityCombinationsPerSet-r17-1)
    -- TAG-AVAILABILITYCOMBINATIONSPERCELL-STOP
    -- ASN1STOP
```

It should be noted that if the frequency domain availability indicator is carried in DCI format 2-5, a maximum value in FreqPositionInDCI-AI-r17 may be defined as maxAI-DCI-PayloadSize-R17, where maxAI-DCI-PayloadSize-R17=maxAI-DCI-PayloadSize-R16. If the frequency domain availability indicator is indicated by using new DCI (for example, DCI format 2_7), a maximum value in Freq-PositionInDCI-AI-r17 may be defined as maxAI-DCI-PayloadSize-R17. A value of maxAI-DCI-PayloadSize-R17 is in DCI format 2_5 provided by a time domain availability combination identifier (AvailabilityCombinationId); and
mapping between an availability combination of some/all frequency domain resources provided by a frequency domain resource availability indicator (FreqResourceAvailability) and a corresponding AI index field value in DCI format 2_5 provided by a frequency domain availability combination identifier (FreqAvailabilityCombinationId).

It should be noted that, in this indication manner, a corresponding time domain entry may be first found according to the time domain availability indicator in DCI format 2_5, and then the corresponding frequency domain availability indicator is found according to the time domain entry and the frequency domain availability indicator, that is, the frequency domain resource indicator is an indicator embedded in each time domain entry.

For an RRC configuration parameter related to frequency domain availability (for example, an available frequency domain resource (FreqResourceAvailablity), an available frequency domain combination identifier (FreqAvailability-CombinationId)), an SCS configuration, and a DCI format, refer to Example 1.

Example 3: RRC indicates a frequency domain indicator granularity, and DCI indicates frequency domain availability.

The CU or the parent IAB node may configure a frequency domain availability indicator granularity for the IAB MT or the IAB DU by using RRC, for example, a frequency domain availability indicator granularity (FreqGranularity).

DCI for indicating frequency domain availability is defined, for example, DCI format 2_7, and the frequency domain availability of the IAB DU is indicated by using the DCI.

The IAB node may determine a length of the frequency domain availability indicator according to a resource bandwidth of the MT or the DU. The length of the frequency domain availability indicator may be one of the following:

If a bitmap (bitmap) is used for indication, a length of an indicator field in the DCI may be ceil (BW/FreqGranularity), where ceil represents rounding up, BW represents the resource bandwidth of the MT or DU, and FreqGranularity represents the frequency domain availability indicator granularity. In this manner, each frequency domain unit corresponds to one bit (bit), and is indicated as available or not available; or a resource of a soft type is indicated as a hard type or an NA type.

If a bitmap is used for indication, a length of an indicator field in the DCI may be 2*ceil (BW/FreqGranularity), where ceil represents rounding up, BW represents the resource bandwidth of the MT or DU, and FreqGranularity represents the frequency domain availability indicator granularity. In this manner, each frequency domain unit corresponds to two bits, and a frequency domain unit resource may be indicated as a soft type, a hard type, or an NA type.

In the case of consecutive indication, a length of an indicator field in the DCI may be ceil (log2 (BW/FreqGranularity))+1, where ceil represents rounding up, BW represents the resource bandwidth of the MT or DU, and FreqGranularity represents the frequency domain availability indicator granularity. One highest or lowest bit indicates available or not available, or indicates a hard type or an NA type; and ceil (log2 (BW/FreqGranularity)) identifies which frequency domain resources are of the indicated attribute.

In the case of consecutive indication, a length of an indicator field in the DCI is 2*ceil (log2 (BW/FreqGranularity))+2, where ceil represents rounding up, BW represents the resource bandwidth of the MT or DU, and FreqGranularity represents the frequency domain availability indicator granularity. One highest or lowest bit indicates a hard type or an NA type; and ceil (log2(BW/FreqGranularity)) identifies which frequency domain resources are of the indicated attribute. A second-highest bit or a second-lowest bit or a second bit+ceil (log2(BW/FreqGranularity)) indicates a hard type or an NA type, and ceil (log2(BW/FreqGranularity)) identifies which frequency domain resources are of the indicated attribute.

The reference SCS used to determine the frequency domain availability may be a parameter configured by RRC.

It should be noted that, in the foregoing manner, a corresponding time domain indicator number (Entry) is first found according to the time domain availability indicator in DCI format 2_5, and then a corresponding frequency domain availability combination is found according to the time domain indicator number and the frequency domain availability indicator. That is, the frequency domain resource indicator is an indicator embedded in each time domain indicator number.

Example 4: Extend a range of an availability indicator field.

In an availability parameter IE (that is, AvailabilityCombinationsPerCell information element) configured by RRC, an indication range of resourceAvailability-r16 is extended.

An optional implementation code of the RRC configuration may be as follows:

```
AvailabilityCombinationsPerCell information element
-- ASN1START
-- TAG-AVAILABILITYCOMBINATIONSPERCELL-START
AvailabilityCombinationsPerCell-r17 ::=                    SEQUENCE {
    availabilityCombinationsPerCellIndex-r16
AvailabilityCombinationsPerCellIndex-r16,
    iab-DU-CellIdentity-r16                    CellIdentity,
    positionInDCI-AI-r16                       INTEGER(0..maxAI-DCI-PayloadSize-r16-1)
OPTIONAL, -- Need M
    availabilityCombinations-r16                          SEQUENCE (SIZE
(1..maxNrofAvailabilityCombinationsPerSet-r16)) OF AvailabilityCombination-r16,
    ...
}
    AvailabilityCombinationsPerCellIndex-r16                        ::=
INTEGER(0..maxNrofDUCells-r16)
    AvailabilityCombination-r16 ::=            SEQUENCE {
    availabilityCombinationId-r16             AvailabilityCombinationId-r16,
    resourceAvailability-r17                              SEQUENCE (SIZE
(1..maxNrofResourceAvailabilityPerCombination-r16)) OF INTEGER (0..N)
}
    AvailabilityCombinationId-r16             ::=                    INTEGER
(0..maxNrofAvailabilityCombinationsPerSet-r16-1)
    -- TAG-AVAILABILITYCOMBINATIONSPERCELL-STOP
    -- ASN1STOP
```

A value range of resourceAvailability-r17 is 0 to N, which represents an availability indicator of an IAB time-frequency domain resource. Optionally, N is a value greater than or equal to 8.

It should be noted that in Rel-16, a value range of resourceAvailability-r16 is 0 to 7, which represents an availability indicator of a time domain UL/DL/flexible symbol.

It should be noted that, in the foregoing manner, a corresponding time domain indicator number (Entry) is first found according to the time domain availability indicator in DCI format 2_5, and then a corresponding frequency domain availability combination is found according to the time domain indicator number and the frequency domain availability indicator. That is, the frequency domain resource indicator is an indicator embedded in each time domain indicator number.

Example 5: F1-C signaling.

The CU configures the frequency domain availability or a frequency domain resource attribute for the DU by using the F1-C signaling.

Configuration parameters of the F1-C signaling may be as follows:

Case 1: Explicitly configure the frequency domain availability by using N PRBs as an indicator granularity.

An optional implementation code may be as follows:
Frequency configuration list:
>Frequency configuration item: 1 . . . <maxnoofFrequencyResource>
>HSNA frequency info ENUMERATED (HARD, SOFT, NOTAVAILABLE).

maxnoofFrequencyResource represents a quantity of indicated frequency domain resources. For example, if 10 PRBs are used as an indicator granularity and a maximum bandwidth is 275 PRBs, 28 frequency domain indicator marks are required.

Case 2: Explicitly configure the frequency domain availability.

An optional implementation code may be as follows:
Frequency configuration list:
>HSNA frequency resource granularity ENUMERATED (RB1, RB2, RB3,RB4, . . . )
>Frequency configuration item: 1 . . . <maxnoofFrequencyResource>
>HSNA frequency info ENUMERATED (HARD, SOFT, NOTAVAILABLE).

RB1, RB2, RB3, and RB4 . . . represent indicator granularities of frequency domain availability indicators.

maxnoofFrequencyResource represents a quantity of indicated frequency domain resources. For example, if 10 PRBs are used as an indicator granularity and a maximum bandwidth is 275 PRBs, 28 frequency domain indicator marks are required.

Case 3: Configure the frequency domain availability according to the resource multiplexing mode in multiplexing info IE.

An optional implementation code may be as follows:

```
IAB-MT Cell Item:
    > IAB-MT Cell Item
        >> NR Cell Identity
        >>DU_RX/MT_RX
            >>> HSNA frequency info   ENUMERATED(HARD, SOFT,
NOTAVAILABLE)
        >>DU_TX/MT_TX
            >>> HSNA frequency info   ENUMERATED(HARD, SOFT,
```

-continued

```
NOTAVAILABLE)
        >>DU_TX/MT_RX
            >>> HSNA frequency info   ENUMERATED(HARD, SOFT,
NOTAVAILABLE)
        >>DU_RX/MT_TX
            >>> HSNA frequency info   ENUMERATED(HARD, SOFT,
NOTAVAILABLE).
```

Case 4: Configure the frequency domain availability according to the resource multiplexing mode in multiplexing info IE.

An optional implementation code may be as follows:

```
IAB-MT Cell List:
    > IAB-MT Cell Item
        >> NR Cell Identity
        >>DU_RX/MT_RX
            >>> HSNA frequency info   ENUMERATED(HARD, SOFT,
NOTAVAILABLE,SIMUTRANSMISSION)
        >>DU_TX/MT_TX
            >>> HSNA frequency info   ENUMERATED(HARD, SOFT,
NOTAVAILABLE,SIMUTRANSMISSION)
        >>DU_TX/MT_RX
            >>> HSNA frequency info   ENUMERATED(HARD, SOFT,
NOTAVAILABLE,SIMUTRANSMISSION)
        >>DU_RX/MT_TX
            >>> HSNA frequency info   ENUMERATED(HARD, SOFT,
NOTAVAILABLE,SIMUTRANSMISSION)
```

SIMUTRANSMISSION indicates that both the MT and the DU support simultaneous scheduling.

Case 5: Configure the frequency domain availability by using a UL/DL/Flexible symbol of a time domain resource as an indicator granularity in gNB -DU Cell Resource Configuration IE.

An optional implementation code may be as follows:

```
HSNA Slot Configuration List
    > HSNA Slot Configuration Item
        >>HSNA Downlink
            >>>HSNA frequency info   ENUMERATED (HARD, SOFT,
NOTAVAILABLE)
        >>HSNA Uplink
            >>>HSNA frequency info   ENUMERATED (HARD, SOFT,
NOTAVAILABLE)
        >>HSNA Flexible
            >>>HSNA frequency info   ENUMERATED (HARD, SOFT,
NOTAVAILABLE).
```

Referring to FIG. 7, FIG. 7 is a structural diagram of an information transmission apparatus according to an embodiment of this application. As shown in FIG. 7, an information transmission apparatus 700 includes:

a transmission module 701, configured to perform information transmission according to frequency domain availability of a distributed unit DU of the IAB node, where the frequency domain availability of the DU of the IAB node is indicated by a parent IAB node of the IAB node, configured by a centralized unit CU, or predefined by a protocol.

Optionally, the apparatus further includes:

a first receiving module, configured to receive a first indicator, where the first indicator is used to indicate at least one of the following:

the frequency domain availability of the DU of the IAB node;

a mapping relationship between an index of a frequency domain availability combination and the frequency domain availability combination;

the frequency domain availability combination; and the index of the frequency domain availability combination.

Optionally, the first indicator is further used to indicate time domain availability of the DU of the IAB node.

Optionally, the first indicator is carried in downlink control information DCI or a Media Access Control control element MAC CE or radio resource control RRC or F1-C signaling or a backhaul adaptation protocol control packet data unit BAP control PDU.

Optionally, a position and/or a size of the first indicator in the DCI is configured by RRC.

Optionally, the position of the first indicator in the DCI is determined according to a position of a time domain availability indicator of the DU of the IAB node in the DCI.

Optionally, the position of the first indicator in the DCI is one of the following:

a position obtained after a position, in the DCI, of a last time domain availability indicator in the DCI is shifted by a first offset value, where the first offset value is an offset value of a frequency domain availability indicator;

a position obtained after the position of the time domain availability indicator of the DU of the IAB node in the DCI is shifted by a second offset value, where the second offset value is a size of the time domain availability indicator; and the position of the time domain availability indicator of the DU of the IAB node in the DCI.

Optionally, the apparatus further includes:

a determining module, configured to determine the frequency domain availability of the DU of the IAB node according to the index that is of the frequency domain availability combination and that is indicated by the first indicator and a first mapping relationship, where the first mapping relationship is a mapping relationship between the index of the frequency domain availability combination and the frequency domain availability combination.

Optionally, an indicator granularity of the frequency domain availability of the DU of the IAB node is determined according to at least one of the following:

a frequency domain availability indicator granularity indicated by F1-C or RRC or a MAC CE or DCI or a BAP control PDU;

a frequency domain availability indicator granularity predefined by the protocol;

a predefined mapping relationship between a bandwidth range of a DU of the parent IAB node of the IAB node and a frequency domain availability indicator granularity;

a predefined mapping relationship between a bandwidth range of the DU of the IAB node and a frequency domain availability indicator granularity;

a predefined mapping relationship between a configurable bandwidth range of a mobile termination MT of the IAB node and a frequency domain availability indicator granularity;

a size of the first indicator;

an available frequency domain resource of the DU of the IAB node;

an actually scheduled frequency domain resource of the DU of the IAB node; and a frequency range of a carrier of the DU of the IAB node.

Optionally, an indicator granularity of the frequency domain availability of the DU of the IAB node is one of the following:

every N physical resource blocks PRBs, where N is a positive integer;

every M resource block groups RBGs, where M is a positive integer;

every K carriers, where K is a positive integer; and every L subbands, where L is a positive integer.

Optionally, the RBG is determined based on a bandwidth.

Optionally, the subband is determined according to an interference related parameter or a channel state information CSI measurement parameter.

Optionally, a subcarrier spacing SCS used to determine the frequency domain availability includes at least one of the following:

an SCS indicated by F1-C, RRC, a MAC CE, DCI, or a BAP control PDU;

an SCS corresponding to a time domain availability combination of the DU of the IAB node;

an SCS configured in an uplink resource configuration and/or a downlink resource configuration of the DU of the IAB node;

an SCS of a PDCCH or an SSB of a primary cell of the IAB node; and an SCS corresponding to a frequency range of a cluster cell of the IAB node.

Optionally, in a case that the uplink resource configuration and/or the downlink resource configuration are/is configured with at least two SCSs, the SCS used to determine the frequency domain availability is one of the following:

a maximum SCS in the at least two SCSs;

a minimum SCS in the at least two SCSs; and an SCS of a synchronization signal block of a primary cell in the at least two SCSs.

Optionally, in a case that an MT of the IAB node and/or the DU of the IAB node are/is configured with at least two SCSs, an SCS used to determine the frequency domain availability is one of the following:

an SCS of a primary cell;

an SCS of a primary secondary cell;

a maximum SCS in the at least two SCSs;

a minimum SCS in the at least two SCSs;

an SCS of a PDCCH or an SSB of a primary cell of a primary cell group;

an SCS of a PDCCH or an SSB of a reference cell of the primary cell group; and an SCS of a PDCCH or an SSB of a reference cell of a secondary cell group.

Optionally, the first indicator is determined according to at least one of the following:

a time domain resource configuration;

a frequency domain resource configuration;

a resource multiplexing mode of the DU and an MT of the IAB node; and a duplex mode of the DU and the MT of the IAB node.

Optionally, the first indicator is applied to at least one of the following:

a resource for which a soft type is configured in time domain;

a resource for which a hard type is configured in time domain;

a resource for which a not available type is configured in time domain;

a resource for which an uplink type is configured in time domain;

a resource for which a downlink type is configured in time domain;

a resource for which a flexible type is configured in time domain; and a resource corresponding to each slot or each symbol.

Optionally, an effective time of the first indicator is determined according to at least one of the following:

a predefined effective time domain parameter of the first indicator; and an indicated or configured effective time domain parameter of the first indicator.

Optionally, the time domain parameter includes at least one of the following: an effective period, a time domain offset, and a time domain resource size.

Optionally, the apparatus further includes:

a second receiving module, configured to receive a second indicator, where the second indicator is used to indicate at least one of a size and a position of an available frequency domain of the DU of the IAB node.

Optionally, the frequency domain availability of the DU of the IAB node is determined according to at least one of the following:

a frequency domain resource of the DU of the IAB node;

a resource multiplexing mode of the DU and an MT of the IAB node; and a duplex mode of the DU and the MT of the IAB node.

Optionally, time-frequency resource availability of the DU of the IAB node is determined according to time domain availability and frequency domain availability of the DU of the IAB node.

Optionally, if the time domain availability of the DU of the IAB node is a soft type and the frequency domain availability is a soft type, the corresponding time-frequency resource availability is a soft type;

if the time domain availability of the DU of the IAB node is a hard type and the frequency domain availability is a soft type, the corresponding time-frequency resource availability is a soft type;

if the time domain availability of the DU of the IAB node is a soft type and the frequency domain availability is a hard type, the corresponding time-frequency resource availability is a soft type; and if the time domain availability of the DU of the IAB node is a soft type and the frequency domain availability is a shared type, the corresponding time-frequency resource availability is a soft type.

Optionally, the apparatus further includes:

a reporting module, configured to report a frequency domain resource parameter, where the frequency domain resource parameter includes at least one of the following: a frequency domain resource boundary, a frequency domain resource range, a frequency domain resource size, and expected frequency domain resource availability.

Optionally, a reporting mode of the frequency domain resource parameter includes one of the following: periodic reporting, event trigger reporting, and poll trigger reporting.

The information transmission apparatus provided in this embodiment of this application can implement the processes in the method embodiment in FIG. 4. To avoid repetition, details are not described herein again.

It should be noted that the information transmission apparatus in this embodiment of this application may be an apparatus, or may be a component, an integrated circuit, or a chip in an IAB node.

Referring to FIG. 8, FIG. 8 is a structural diagram of another information transmission apparatus according to an embodiment of this application. As shown in FIG. 8, an information transmission apparatus 800 includes:

a first indicating module 801, configured to indicate frequency domain availability of a DU of an IAB node to the IAB node.

Optionally, the first indicating module is specifically configured to:

send a first indicator to the IAB node, where the first indicator is used to indicate at least one of the following:

the frequency domain availability of the DU of the IAB node;

a mapping relationship between an index of a frequency domain availability combination and the frequency domain availability combination;

the frequency domain availability combination; and the index of the frequency domain availability combination.

Optionally, the first indicator is further used to indicate time domain availability of the DU of the IAB node.

Optionally, the first indicator is carried in downlink control information DCI or a Media Access Control control element MAC CE or radio resource control RRC.

Optionally, a position and/or a size of the first indicator in the DCI is configured by RRC.

Optionally, the position of the first indicator in the DCI is determined according to a position of a time domain availability indicator of the DU of the IAB node in the DCI.

Optionally, the position of the first indicator in the DCI is one of the following:

a position obtained after a position, in the DCI, of a last time domain availability indicator in the DCI is shifted by a first offset value, where I is an offset value of a frequency domain availability indicator;

a position obtained after the position of the time domain availability indicator of the DU of the IAB node in the DCI is shifted by a second offset value, where J is a size of the time domain availability indicator; and the position of the time domain availability indicator of the DU of the IAB node in the DCI.

Optionally, the first indicator is carried in F1-C signaling or a backhaul adaptation protocol control packet data unit.

Optionally, the apparatus further includes at least one of the following:

a second indicating module, configured to indicate an indicator granularity of the frequency domain availability to the IAB node; and a third indicating module, configured to indicate, to the IAB node, an SCS used to determine the frequency domain availability.

Optionally, an indicator granularity of the frequency domain availability of the DU of the IAB node is determined according to at least one of the following:

a frequency domain availability indicator granularity predefined by the protocol;

a predefined mapping relationship between a bandwidth range of a DU of the parent IAB node of the IAB node and a frequency domain availability indicator granularity;

a predefined mapping relationship between a bandwidth range of the DU of the IAB node and a frequency domain availability indicator granularity;

a predefined mapping relationship between a configurable bandwidth range of a mobile termination MT of the IAB node and a frequency domain availability indicator granularity;

a size of the first indicator;

an available frequency domain resource of the DU of the IAB node;

an actually scheduled frequency domain resource of the DU of the IAB node; and a frequency range of a carrier of the DU of the IAB node.

Optionally, an indicator granularity of the frequency domain availability of the DU of the IAB node is one of the following:

every N physical resource blocks PRBs, where N is a positive integer;

every M resource block groups RBGs, where M is a positive integer;

every K carriers, where K is a positive integer; and every L subbands, where L is a positive integer.

Optionally, the RBG is determined based on a bandwidth.

Optionally, the subband is determined according to an interference related parameter or a channel state information CSI measurement parameter.

Optionally, a subcarrier spacing SCS used to determine the frequency domain availability includes one of the following:

an SCS corresponding to a time domain availability combination of the DU of the AB node;

an SCS configured in an uplink resource configuration and/or a downlink resource configuration of the DU of the IAB node;

an SCS of a PDCCH or an SSB of a primary cell of the IAB node; and an SCS corresponding to a frequency range of a cluster cell of the IAB node.

Optionally, in a case that the uplink resource configuration and/or the downlink resource configuration are/is configured with at least two SCSs, the SCS used to determine the frequency domain availability is one of the following:

a maximum SCS in the at least two SCSs;

a minimum SCS in the at least two SCSs; and an SCS of a synchronization signal block of a primary cell in the at least two SCSs.

Optionally, in a case that an MT of the IAB node and/or the DU of the IAB node are/is configured with at least two SCSs, an SCS used to determine the frequency domain availability is one of the following:

an SCS of a primary cell;

an SCS of a primary secondary cell;

a maximum SCS in the at least two SCSs;

a minimum SCS in the at least two SCSs;

an SCS of a PDCCH or an SSB of a primary cell of a primary cell group;

an SCS of a PDCCH or an SSB of a reference cell of the primary cell group; and an SCS of a PDCCH or an SSB of a reference cell of a secondary cell group.

Optionally, the first indicator is determined according to at least one of the following:

a time domain resource configuration;

a frequency domain resource configuration;

a resource multiplexing mode of the DU and an MT of the IAB node; and a duplex mode of the DU and the MT of the IAB node.

Optionally, the first indicator is applied to at least one of the following:

a resource for which a soft type is configured in time domain;

a resource for which a hard type is configured in time domain;

a resource for which a not available type is configured in time domain;

a resource for which an uplink type is configured in time domain;

a resource for which a downlink type is configured in time domain;

a resource for which a flexible type is configured in time domain; and a resource corresponding to each slot or each symbol.

Optionally, the apparatus further includes:

a first sending module, configured to send, to the IAB node, an effective time domain parameter of the first indicator.

Optionally, the time domain parameter includes at least one of the following: an effective period, a time domain offset, and a time domain resource size.

Optionally, the apparatus further includes:

a second sending module, configured to send a second indicator, where the second indicator is used to indicate at least one of a size and a position of an available frequency domain of the DU of the IAB node.

Optionally, the frequency domain availability of the DU of the IAB node is determined according to at least one of the following:

a frequency domain resource of the DU of the IAB node;

a resource multiplexing mode of the DU and an MT of the IAB node; and a duplex mode of the DU and the MT of the IAB node.

Optionally, time-frequency resource availability of the DU of the IAB node is determined according to time domain availability and frequency domain availability of the DU of the IAB node.

Optionally, if the time domain availability of the DU of the IAB node is a soft type and the frequency domain availability is a soft type, the corresponding time-frequency resource availability is a soft type;

if the time domain availability of the DU of the IAB node is a hard type and the frequency domain availability is a soft type, the corresponding time-frequency resource availability is a soft type;

if the time domain availability of the DU of the IAB node is a soft type and the frequency domain availability is a hard type, the corresponding time-frequency resource availability is a soft type; and if the time domain availability of the DU of the IAB node is a soft type and the frequency domain availability is a shared type, the corresponding time-frequency resource availability is a soft type.

Optionally, the apparatus further includes:

a receiving module, configured to receive a frequency domain resource parameter reported by the IAB node, where the frequency domain resource parameter includes at least one of the following: a frequency domain resource boundary, a frequency domain resource range, a frequency domain resource size, and expected frequency domain resource availability.

Optionally, a reporting mode of the frequency domain resource parameter includes one of the following: periodic reporting, event trigger reporting, and poll trigger reporting.

The information transmission apparatus provided in this embodiment of this application can implement the processes in the method embodiment in FIG. 6. To avoid repetition, details are not described herein again.

It should be noted that the information transmission apparatus in this embodiment of this application may be an apparatus, or may be a component, an integrated circuit, or a chip in a CU or a parent IAB node of an IAB node.

Figure 9:
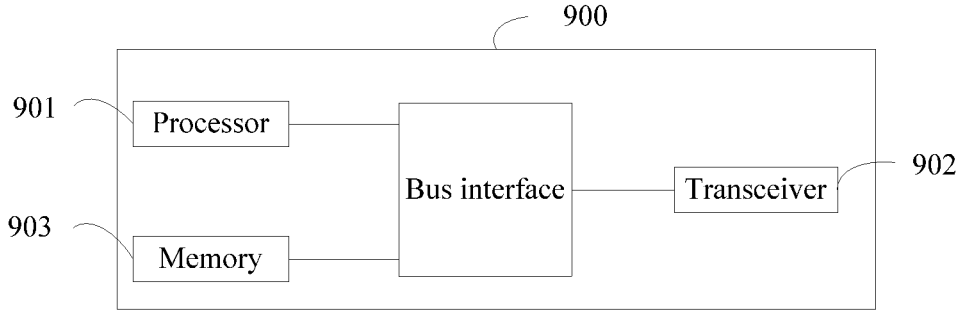
FIG. 9 is a structural diagram of an IAB node according to an embodiment of this application.

Referring to FIG. 9, FIG. 9 is a structural diagram of an IAB node according to an embodiment of this application. An IAB node 900 includes a processor 901, a transceiver 902, a memory 903, and a bus interface.

The transceiver 902 is configured to perform information transmission according to frequency domain availability of a distributed unit DU of the IAB node, where the frequency domain availability of the DU of the IAB node is indicated by a parent IAB node of the IAB node, configured by a centralized unit CU, or predefined by a protocol.

It should be understood that, in this embodiment, the processor 901 and the transceiver 902 can implement the processes implemented by the IAB node in the method embodiment in FIG. 4, and a same technical effect can be achieved. To avoid repetition, details are not described herein again.

It should be noted that the transceiver 902 is configured to receive and send data under the control of the processor 901. The transceiver 902 includes at least two antenna ports.

In FIG. 9, a bus architecture may include any quantity of interconnected buses and bridges. Specifically, various circuits of one or more processors represented by the processor 901 and a memory represented by the memory 903 are interconnected. The bus architecture may further link various other circuits such as a peripheral device, a voltage regulator, and a power management circuit. These are well known in the art, and therefore are not further described in this specification. A bus interface provides an interface. The transceiver 902 may be a plurality of components. To be specific, the transceiver 902 includes a transmitter and a receiver, and provides a unit configured to communicate with various other apparatuses on a transmission medium. For different user equipment, a user interface 904 may be an interface that can externally or internally connect to a needed device, and the connected device includes but is not limited to a keypad, a display, a loudspeaker, a microphone, and a joystick.

The processor 901 is responsible for bus architecture management and general processing. The memory 903 may store data used by the processor 901 when the processor 901 performs an operation.

Optionally, an embodiment of this application further provides an IAB node, including a processor 901, a memory 903, and a program or an instruction that is stored in the memory 903 and that can be run on the processor 901. The program or the instruction is executed by the processor 901 to implement the processes of the foregoing information transmission method embodiment and a same technical effect can be achieved. To avoid repetition, details are not described herein again.

Figure 10:
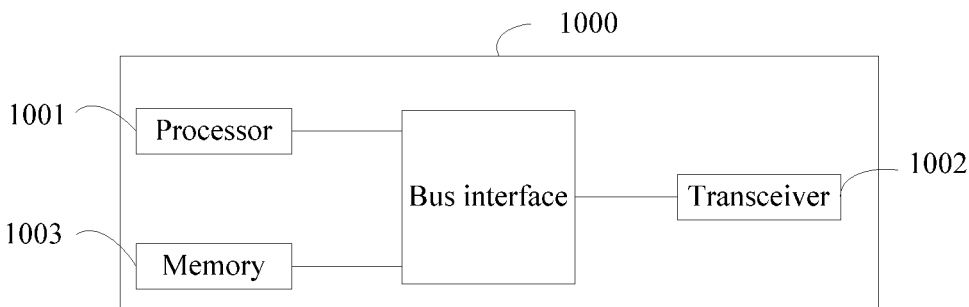
FIG. 10 is a structural diagram of a network device according to an embodiment of this application.

Referring to FIG. 10, FIG. 10 is a structural diagram of a network device according to an embodiment of this application. A network device 1000 includes a processor 1001, a transceiver 1002, a memory 1003, and a bus interface.

The transceiver 1002 is configured to indicate frequency domain availability of a DU of an IAB node to the IAB node.

It should be understood that, in this embodiment, the processor 1001 and the transceiver 1002 can implement the processes implemented by the network device in the method embodiment in FIG. 6, and a same technical effect can be achieved. To avoid repetition, details are not described herein again.

It should be noted that the transceiver 1002 is configured to receive and send data under the control of the processor 1001. The transceiver 1002 includes at least two antenna ports.

In FIG. 10, a bus architecture may include any quantity of interconnected buses and bridges. Specifically, various circuits of one or more processors represented by the processor 1001 and a memory represented by the memory 1003 are interconnected. The bus architecture may further link various other circuits such as a peripheral device, a voltage regulator, and a power management circuit. These are well known in the art, and therefore are not further described in this specification. A bus interface provides an interface. The transceiver 1002 may be a plurality of components. To be specific, the transceiver 1002 includes a transmitter and a receiver, and provides a unit configured to communicate with various other apparatuses on a transmission medium. For different user equipment, a user interface 1004 may be an interface that can externally or internally connect to a needed device, and the connected device includes but is not limited to a keypad, a display, a loudspeaker, a microphone, and a joystick.

The processor 1001 is responsible for bus architecture management and general processing. The memory 1003 may store data used by the processor 1001 when the processor 1001 performs an operation.

Optionally, an embodiment of this application further provides a network device, including a processor 1001, a memory 1003, and a program or an instruction that is stored in the memory 1003 and that can be run on the processor 1001. The program or the instruction is executed by the processor 1001 to implement the processes of the foregoing information transmission method embodiment, and a same technical effect can be achieved. To avoid repetition, details are not described herein again.

An embodiment of this application further provides a readable storage medium. The readable storage medium may be non-volatile or volatile. The readable storage medium stores a program or an instruction, and the program or the instruction is executed by a processor to implement the processes of the information transmission method embodiment on the IAB node side or the information transmission method embodiment on the network device side, and a same technical effect can be achieved. To avoid repetition, details are not described herein again.

The processor is a processor in the IAB node in the foregoing embodiment. The readable storage medium includes a computer-readable storage medium, such as a computer read-only memory (Read-Only Memory, ROM), a random access memory (Random Access Memory, RAM), a magnetic disk, or an optical disc.

An embodiment of this application further provides a chip. The chip includes a processor and a communications interface, the communications interface is coupled to the processor, and the processor is configured to run a program or an instruction to implement the processes of the information transmission method embodiment on the IAB node side or the information transmission method embodiment on the network device side, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer software product. The computer software product is stored in a non-transitory readable storage device, and the computer software product is executed by at least one processor to implement the processes of the information transmission method embodiment on the IAB node side or the information transmission method embodiment on the network device side, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing an integrated access backhaul IAB node to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An information transmission method, wherein the method is performed by an integrated access backhaul IAB node and the method comprises:

performing information transmission according to frequency domain availability of a distributed unit DU of the IAB node, wherein the frequency domain availability of the DU of the IAB node is indicated by a parent IAB node of the IAB node, or configured by a centralized unit CU;

wherein the method further comprises:

receiving a first indicator, wherein the first indicator is used to indicate the frequency domain availability of the DU of the IAB node;

wherein an indicator granularity of the frequency domain availability of the DU of the IAB node is determined according to a frequency domain availability indicator granularity indicated by F1-C or RRC;

wherein an indicator granularity of the frequency domain availability of the DU of the IAB node is one of the following:

every N physical resource blocks PRBs, wherein N is a positive integer and N is indicated by a parent IAB node or CU;

every M resource block groups RBGs, wherein M is a positive integer and M is indicated by a parent IAB node or CU.

2. The method according to claim 1, wherein the first indicator is further used to indicate at least one of the following:

a mapping relationship between an index of a frequency domain availability combination and the frequency domain availability combination;

the frequency domain availability combination; and the index of the frequency domain availability combination.

3. The method according to claim 1, wherein the first indicator is further used to indicate time domain availability of the DU of the IAB node.

4. The method according to claim 1, wherein the first indicator is carried in downlink control information DCI or a Media Access Control control element MAC CE or radio resource control RRC or F1-C signaling or a backhaul adaptation protocol control packet data unit BAP control PDU.

5. The method according to claim 4, wherein a position and/or a size of the first indicator in the DCI is configured by RRC.

6. The method according to claim 4, wherein the position of the first indicator in the DCI is determined according to a position of a time domain availability indicator of the DU of the IAB node in the DCI.

7. The method according to claim 6, wherein the position of the first indicator in the DCI is one of the following:

a position obtained after a position, in the DCI, of a last time domain availability indicator in the DCI is shifted by a first offset value, wherein the first offset value is an offset value of a frequency domain availability indicator;

a position obtained after the position of the time domain availability indicator of the DU of the IAB node in the DCI is shifted by a second offset value, wherein the second offset value is a size of the time domain availability indicator; and the position of the time domain availability indicator of the DU of the IAB node in the DCI.

8. The method according to claim 1, wherein the method further comprises:

determining the frequency domain availability of the DU of the IAB node according to the index that is of the frequency domain availability combination and that is indicated by the first indicator and a first mapping relationship, wherein the first mapping relationship is a mapping relationship between the index of the frequency domain availability combination and the frequency domain availability combination.

9. The method according to claim 1, wherein the indicator granularity of the frequency domain availability of the DU of the IAB node is determined according to at least one of the following:

a frequency domain availability indicator granularity indicated by a MAC CE or DCI or a BAP control PDU;

a frequency domain availability indicator granularity predefined by the protocol;

a predefined mapping relationship between a bandwidth range of a DU of the parent IAB node of the IAB node and a frequency domain availability indicator granularity;

a predefined mapping relationship between a bandwidth range of the DU of the IAB node and a frequency domain availability indicator granularity;

a predefined mapping relationship between a configurable bandwidth range of a mobile termination MT of the IAB node and a frequency domain availability indicator granularity;

a size of the first indicator;

an available frequency domain resource of the DU of the IAB node;

an actually scheduled frequency domain resource of the DU of the IAB node; and a frequency range of a carrier of the DU of the IAB node.

10. The method according to claim 1, wherein an indicator granularity of the frequency domain availability of the DU of the IAB node is one of the following:

every K carriers, wherein K is a positive integer; and every L subbands, wherein L is a positive integer.

11. The method according to claim 10, wherein the RBG is determined based on a bandwidth.

12. The method according to claim 10, wherein when the indicator granularity of the frequency domain availability of the DU of the IAB node is every L subbands, the subband is determined according to an interference related parameter or a channel state information CSI measurement parameter.

13. The method according to claim 1, wherein a subcarrier spacing SCS used to determine the frequency domain availability comprises at least one of the following:

an SCS indicated by F1-C, RRC, a MAC CE, DCI, or a BAP control PDU;

an SCS corresponding to a time domain availability combination of the DU of the IAB node;

an SCS configured in an uplink resource configuration and/or a downlink resource configuration of the DU of the IAB node;

an SCS of a PDCCH or an SSB of a primary cell of the IAB node; and an SCS corresponding to a frequency range of a cluster cell of the IAB node.

14. The method according to claim 13, wherein in a case that the uplink resource configuration and/or the downlink resource configuration are/is configured with at least two SCSs, the SCS used to determine the frequency domain availability is one of the following:

a maximum SCS in the at least two SCSs;

a minimum SCS in the at least two SCSs; and an SCS of a synchronization signal block of a primary cell in the at least two SCSs.

15. The method according to claim 2, wherein in a case that an MT of the IAB node and/or the DU of the IAB node are/is configured with at least two SCSs, an SCS used to determine the frequency domain availability is one of the following:

an SCS of a primary cell;

an SCS of a primary secondary cell;

a maximum SCS in the at least two SCSs;

a minimum SCS in the at least two SCSs;

an SCS of a PDCCH or an SSB of a primary cell of a primary cell group;

an SCS of a PDCCH or an SSB of a reference cell of the primary cell group; and an SCS of a PDCCH or an SSB of a reference cell of a secondary cell group.

16. The method according to claim 1, wherein the first indicator is determined according to at least one of the following:

a time domain resource configuration;

a frequency domain resource configuration;

a resource multiplexing mode of the DU and an MT of the IAB node; and a duplex mode of the DU and the MT of the IAB node.

17. The method according to claim 16, wherein the first indicator is applied to at least one of the following:

a resource for which a soft type is configured in time domain;

a resource for which a hard type is configured in time domain;

a resource for which a not available type is configured in time domain;

a resource for which an uplink type is configured in time domain;

a resource for which a downlink type is configured in time domain;

a resource for which a flexible type is configured in time domain; and a resource corresponding to each slot or each symbol.

18. The method according to claim 1, wherein the method further comprises:

receiving a second indicator, wherein the second indicator is used to indicate at least one of a size and a position of an available frequency domain of the DU of the IAB node.

19. An IAB node, comprising a memory, a processor, and a program or an instruction that is stored in the memory and that can be run on the processor, wherein when the program or the instruction is executed by the processor, steps of an information transmission method are implemented, the method comprises:

performing information transmission according to frequency domain availability of a distributed unit DU of the IAB node, wherein the frequency domain availability of the DU of the IAB node is indicated by a parent IAB node of the IAB node, or configured by a centralized unit CU;

wherein the method further comprises:

receiving a first indicator, wherein the first indicator is used to indicate the frequency domain availability of the DU of the IAB node;

wherein an indicator granularity of the frequency domain availability of the DU of the IAB node is determined according to a frequency domain availability indicator granularity indicated by F1-C or RRC;

wherein an indicator granularity of the frequency domain availability of the DU of the IAB node is one of the following:

every N physical resource blocks PRBs, wherein N is a positive integer and N is indicated by a parent IAB node or CU;

every M resource block groups RBGs, wherein M is a positive integer and M is indicated by a parent IAB node or CU.

20. A non-transitory readable storage medium, wherein the readable storage medium stores a program or an instruction, and the program or the instruction is executed by a processor to implement steps of an information transmission method, the method comprises:

performing information transmission according to frequency domain availability of a distributed unit DU of the IAB node, wherein the frequency domain availability of the DU of the IAB node is indicated by a parent IAB node of the IAB node, or configured by a centralized unit CU;

wherein the method further comprises:

receiving a first indicator, wherein the first indicator is used to indicate the frequency domain availability of the DU of the IAB node;

wherein an indicator granularity of the frequency domain availability of the DU of the IAB node is determined according to a frequency domain availability indicator granularity indicated by F1-C or RRC;

wherein an indicator granularity of the frequency domain availability of the DU of the IAB node is one of the following:

every N physical resource blocks PRBs, wherein N is a positive integer and N is indicated by a parent IAB node or CU;

every M resource block groups RBGs, wherein M is a positive integer and M is indicated by a parent IAB node or CU.

* * * * *